(12) United States Patent
Griffis et al.

(10) Patent No.: US 7,830,442 B2
(45) Date of Patent: Nov. 9, 2010

(54) COMPACT ECONOMICAL LIDAR SYSTEM

(75) Inventors: Andrew Griffis, Tucson, AZ (US); Gregory Fetzer, Tucson, AZ (US); Brian Redman, Silver Spring, MD (US); David Sitter, Torrance, CA (US); Asher Gelbart, Tucson, AZ (US)

(73) Assignee: Areté Associates, Northridge, CA (US)

( * ) Notice: Subject to any disclaimer, the term of this patent is extended or adjusted under 35 U.S.C. 154(b) by 2123 days.

(21) Appl. No.: 10/426,907

(22) Filed: Apr. 29, 2003

(65) Prior Publication Data

US 2004/0119838 A1  Jun. 24, 2004

Related U.S. Application Data

(60) Provisional application No. 60/377,323, filed on Apr. 30, 2002.

(51) Int. Cl.
*H04N 5/225*  (2006.01)
(52) U.S. Cl. .................. 348/340; 348/231.99
(58) Field of Classification Search ............ 348/31, 348/231.99, 335, 340; 356/4.01, 5.01, 609
See application file for complete search history.

(56) References Cited

U.S. PATENT DOCUMENTS

| | | | |
|---|---|---|---|
| 4,518,256 A | | 5/1985 | Schwartz |
| 4,926,050 A | | 5/1990 | Shemwell |
| 5,249,046 A | * | 9/1993 | Ulich et al. .................. 348/31 |
| 6,252,544 B1 | * | 6/2001 | Hoffberg ................. 342/357.1 |
| 6,556,282 B2 | * | 4/2003 | Jamieson et al. .......... 356/4.01 |
| 6,836,285 B1 | * | 12/2004 | Lubard et al. ................. 348/31 |
| 2003/0016350 A1 | * | 1/2003 | Cheng et al. ................ 356/301 |
| 2003/0137646 A1 | * | 7/2003 | Hoffman et al. .......... 356/4.01 |

\* cited by examiner

*Primary Examiner*—Gevell Selby
(74) *Attorney, Agent, or Firm*—Peter I. Lippman

(57) ABSTRACT

A lidar pulse is time resolved in ways that avoid costly, fragile, bulky, high-voltage vacuum devices—and also costly, awkward optical remappers or pushbroom layouts—to provide preferably 3D volumetric imaging from a single pulse, or full-3D volumetric movies. Delay lines or programmed circuits generate time-resolution sweep signals, ideally digital. Preferably, discrete 2D photodiode and transimpedance-amplifier arrays replace a continuous 1D streak-tube cathode. For each pixel a memory-element array forms range bins. An intermediate optical buffer with low, well-controlled capacitance avoids corruption of input signal by these memories.

31 Claims, 24 Drawing Sheets

US 7,830,442 B2

COMPACT ECONOMICAL LIDAR SYSTEM

RELATED PATENT DOCUMENTS

This document claims priority of U.S. provisional patent application Ser. No. 60/377,323 filed on Apr. 4, 2002.

Closely related documents are other, coowned U.S. utility-patent documents and references—hereby wholly incorporated by reference into this document. Those documents are in the names of:

Kent Bowker et al., U.S. provisional patent application Ser. No. 5,467,122, "UNDERWATER IMAGING IN REAL TIME, USING SUBSTANTIALLY DIRECT DEPTH-TO-DISPLAY-HEIGHT LIDAR STREAK MAPPING" and earlier documents cited therein; as well as Ser. No. 6,400,396 B1, "DISPLACED-BEAM CONFOCAL-REFLECTION STREAK TUBE APPARATUS WITH STRIP-SHAPED PHOTOCATHODE, FOR IMAGING VERY SMALL OBJECTS AND OBJECTS THEREIN", and also PCT publication PCT/US95/15491 "IMAGING LIDAR SYSTEM WITH STRIP-SHAPED PHOTOCATHODE AND CONFOCAL REFLECTION"; and Areté Associates, PCT publication PCT/US01/13489, entitled "MS-STIL LIDAR".

Other patents and literature of interest, also wholly incorporated, include:

Frederick K. Knight et al., U.S. Patent Re. 33,865, "DETECTOR FOR THREE-DIMENSIONAL OPTICAL IMAGING;

Robert R. Alfano et al., U.S. Pat. No. 5,142,372, "THREE-DIMENSIONAL OPTICAL IMAGING OF SEMI-TRANSPARENT AND OPAQUE OBJECTS USING ULTRASHORT LIGHT PULSES, A STREAK CAMERA AND A COHERENT FIBER BUNDLE";

D. V. Plant, et al., "A 256 Channel Bi-Directional Optical Interconnect Using VCSELs and Photodiodes on CMOS", *Optics in Computing* 2000, SPIE Vol. 4089;

E. M. Strzelecka, et al., "VCSEL Based Modules for Optical Interconnects", *SPIE Conference on Vertical-Cavity Surface-Emitting Lasers III*, SPIE Vol. 3627, Jan. 1999;

J. Kim, et al., "32×16 CMOS Smart Pixel Array for Optical Interconnects", *Optics in Computing* 2000, SPIE Vol. 4089;

J. Jiang Liu, et al., "Multi-Channel Parallel Free-Space VCSEL Optoelectronic Interconnects for Digital Data Transmission and Processing", *Proceedings of SPIE* Vol. 4046 (2000);

Jim Tatum and Jim Guenter, "Modulating VCSELs", *Honeywell Application Sheet*, February 1998; and Philip Hobbs, *Building Electro-Optical Systems*.

FIELD OF THE INVENTION

This invention relates generally to imaging; and more particularly to a system and method using lidar (light detecting and ranging) to characterize one or more objects or features in a medium.

BACKGROUND

Several techniques have evolved for dealing with the problems associated with detecting objects in a light-scattering medium. Many of these techniques and their drawbacks are discussed in the above-referenced U.S. Pat. No. 5,467,122.

Other techniques include using an imaging system based on one or more analog-to-digital converters (ADCs). In such a system, light is first directed toward an object to be imaged.

Light that is reflected back from the object is then directed to a comparator. If the comparator detects a requisitely large signal, a state change is produced which in turn triggers an ADC to direct a signal to a streak or charge-coupled device (CCD) camera for imaging.

The drawbacks of this technique, however, are multifold. If a single ADC is used in the system, it may entirely miss a multiplicity of signals reflected back from juxtaposed objects. It may, instead, form only a partial image of such objects based on just the leading edge of a signal waveform.

Additionally, use of a single ADC restricts the imaging to very small area coverage. Furthermore, even a single ADC is typically a large bulky system and generates a great amount of heat. Thus, even if several ADCs are used collectively to effectively increase the range, both the size and heat accumulation issues remain to be overcome. Dealing with these issues adds to the cost of producing such systems, as does the fact that the applicable ADC systems are not typically prefabricated. Most of the commercially available ones are for physically small arrays or for very-large-scale integration (VLSI).

Another problematic technique is commonly referred to as the "Magic Lantern". For this technique, several intensified CCD cameras are used to define range bins. Each camera is dedicated to a separate piece of time referred to as a trigger image point.

This approach, however, leads to poor range resolution and area coverage—especially for objects that are spaced far apart along the range direction. As discussed at length in the previously mentioned '122 patent, this is basically another range-gating technique. Like the ADC system, it has the drawbacks of poor ability to see clustered detail or to acquire multiple events over a single lidar pulse.

Streak-tube lidar systems are generally based on the generation of a periodic series of discrete pushbroom-shaped pulse beams to illuminate an object in semiturbid medium. When reflected back, the pulses are collected through a slit and onto a streak tube—which is in turn coupled to an imaging detector such as a CCD for imaging.

Such streak-tube lidar systems overcome many of the aforementioned problems, but are subject to certain drawbacks. The streak tube itself is a complex, bulky, expensive and relatively fragile vacuum-tube device, requiring high voltages for both basic operation and control.

As will be seen, these characteristics impose severe limitations upon any effort to generate or use images in other formats or for different purposes. The possible existence of such variations in format and purpose are themselves considered part of the present invention; hence these configurations will be introduced in a later section of the present document.

What is needed, to realize such novel configurations and purposes, is an imaging system that provides an accurate and reliable image of an object in a light-scattering medium—and that not only eliminates the problems associated with range-gating techniques and bulky, heat-generating ADCs but is also relatively inexpensive to produce as well as compact and more-easily transportable. Important aspects of lidar imaging thus remain amenable to useful refinement.

SUMMARY OF THE DISCLOSURE

The present invention introduces such refinement. The invention has several main facets or aspects that can be used independently, although for best enjoyment of their benefits certain of these aspects or facets are preferably practiced in combinations together.

In a first of these independent facets or aspects, the present invention is a lidar system. The system includes some means for generating a measurement signal that is at least one-dimensional, corresponding to a received at-least-one-dimensional lidar-beam pulse. For purposes of breadth and generality in discussion of the invention, these means will be called simply the "generating means".

This first main aspect of the invention also includes some means for time-resolving the measurement signal. Again for generality and breadth these means will be called the "resolving means". They include:

multiple memory elements for receiving and holding successive portions of the measurement signal respectively, some digital means for forming a digital sweep signal defining multiple digital states corresponding to the respective memory elements (the "forming means"), and some means for applying the digital sweep signal to control distribution of the successive measurement-signal portions into the respective memory elements (the "applying means").

Also part of this first facet of the invention are some means for reading the measurement-signal portions from the memory elements. These means may be called the "reading means".

The foregoing may represent a description or definition of the first aspect or facet of the invention in its broadest or most general form. Even as couched in these broad terms, however, it can be seen that this facet of the invention importantly advances the art.

In particular, use of a digital sweep is one key to particularly efficient, economical and cost-effective lidar systems that make use of commercial, off-the-shelf fast modern electronics. Such systems can replace the high-voltage, heavy, bulky and fragile streak tube in all applications but the most extremely demanding—in terms of range resolution.

Although the first major aspect of the invention thus significantly advances the art, nevertheless to optimize enjoyment of its benefits preferably the invention is practiced in conjunction with certain additional features or characteristics. In particular, preferably the forming means include a logic circuit generating a series of digital pointers addressing the memory elements respectively.

In event this basic preference is observed, then certain subpreferences come into play. For example, first it is preferred that the memory elements include a dynamic RAM or other capacitive array receiving the measurement signal-portions substantially directly from the distribution controlled by the digital pointers.

A second such subpreference is that the system further include multiple buffer switches transferring the successive measurement-signal portions to the multiple memory elements respectively. It is still further preferred that each buffer switch have a respective enable terminal actuated by a respective one of the digital pointers.

As an alternative preference to the basic logic-circuit preference mentioned above (still for implementing the first main independent aspect of the invention), the forming means preferably include a tapped delay line having multiple taps addressing the multiple memory elements respectively. If this second basic preference is adopted, then certain subpreferences are applicable.

One of these is that the memory elements include a dynamic RAM or other capacitive array receiving the measurement signal-portions substantially directly from the distribution controlled by the delay-line taps. Another subpreference is that the system further include multiple buffer switches transferring the successive measurement-signal portions to the multiple memory elements respectively; and that each buffer switch have a respective enable terminal actuated by a respective one of the delay-line taps.

In yet a third basic preference that can be used in place of the first two just discussed, the forming means include a delay line that includes the memory elements. Here the delay line itself has clock signals serving as the digital sweep signal; and the delay line responds to the clock signals by successively advancing the received successive measurement-signal portions into the delay line.

If the system is made to follow this third basic preference, then once again corresponding subpreferences are of interest. One of these is that the memory elements preferably include a dynamic RAM or other capacitive array receiving the measurement signal-portions substantially directly from the distribution controlled by the clock signals.

Another subpreference is that the delay line be a shift register; that the memory elements be successive positions in the shift register itself; and that the reading means include parallel circuits for reading plural measurement-signal portions substantially simultaneously from the shift register. Yet another subpreference is that the system preferably further include an analog-to-digital converter, digitizing the successive measurement-signal portions for application to the delay line.

Regardless of which of the three above-described basic preferences (or other configurations) may be selected, certain additional preferences are also applicable for use in the first main facet of the invention. In particular preferably the system further includes:

multiple electrooptical converters respectively receiving the successive measurement-signal portions from the buffer switches, respectively, and in response generating corresponding optical signals; and multiple optoelectronic converters receiving the corresponding optical signals and in response generating new corresponding measurement-signal portions for application to the multiple memory elements.

As will be understood, by "electrooptical converters" is meant devices that are driven by electrical input signals and produce corresponding optical output signals; and by "optoelectronic converters" is meant the converse—e. g., devices driven optically to produce electronic output.

In this case, in turn preferably the electrooptical converters are VCSELs, LEDs, or organic LEDs. At the same time, preferably the optoelectronic converters are CMOS elements, organic phase-shift molecular devices, or a printed-circuit stack of thin-film devices.

Also regardless of which of the three basic preferences is adopted, preferably the system is specifically equipped for detecting and ranging objects, and accordingly further includes some means for projecting an at-least-one-dimensional light pulse toward the objects; and some means for receiving an at-least-one-dimensional reflected light pulse from the objects. Thus the previously mentioned generating means are able to generate the measurement signal in response to the received light pulse.

Now turning to a second of the main independent facets or aspects of the invention: in preferred embodiments of this second facet, the invention is again a lidar system having means for generating a measurement signal corresponding to a received lidar-beam pulse, and means for time-resolving the measurement signal.

Preferred embodiments of this second aspect of the invention also include multiple electrooptical converters that respectively receive time-resolved measurement-signal portions from the resolving means. In response these converters form new corresponding optical signals. Such converters may be recognized as preferable features of the first main facet of the invention, discussed above.

This system also includes some means for reading the measurement-signal portions as the new corresponding optical signals from the electrooptical converters. The foregoing may represent a description or definition of the second aspect or facet of the invention in its broadest or most general form.

Even as couched in these broad terms, however, it can be seen that this facet of the invention importantly advances the art. In particular, as will be seen the use of such electrooptical converters offers a present, short-term-available solution to the problem of controlling measurement capacitances. A variety of such converters on the market makes this solution particularly appealing.

This market availability is especially important because certain of these devices are enjoying extensive ongoing development for the telecommunications industry. Components introduced in this way are configured in multiple-unit arrays with low cost and power but high linearity—and consistent, controllable input and output capacitance. These several properties make the devices ideal for use in facilitating lidar-signal time resolution.

Although the second major aspect of the invention thus significantly advances the art, nevertheless to optimize enjoyment of its benefits preferably the invention is practiced in conjunction with certain additional features or characteristics. Many of these have been mentioned previously as preferences for the first main facet of the invention.

In particular, preferably the electrooptical converters are vertical cavity surface-emitting lasers ("VCSELs"). These are devices only recently introduced as telecommunications components but now readily available with all the favorable properties mentioned in the preceding paragraph.

An alternative preference for the electrooptical converters, not far behind in terms of the listed properties, are LEDs. Still another preference is organic LEDs.

A second basic preference is that the system further include multiple optoelectronic converters receiving the corresponding new optical signals from the electrooptical converters (e.g. VCSELs) and in response forming new corresponding measurement-signal portions for readout by the reading means. If such optoelectronic converters are used, one particularly preferable choice of such devices CMOS elements. Another is optical phase-shift molecules, and yet another is printed-circuit stacks of thin-film devices.

A further basic preference is that the resolving means include multiple buffer switches directing the time-resolved measurement-signal portions to the multiple electrooptical converters, respectively. The multiple buffer switches advantageously include respective enable terminals actuated by synchronous enable signal.

Such an enable signal is "synchronous" in the sense of being substantially in controlled-delay synchronism with the lidar-beam pulse. Preferably, before arrival of the synchronous enable signal each enable terminal is connected to receive a bias input that holds the respective electrooptical converter just within a quiescent state.

Also preferably readout from the respective electrooptical converter is terminated by another synchronous signal. This signal is provided after a time interval allowing for collection of the time-resolved measurement-signal portion from that respective electrooptical converter.

Regardless of the here-mentioned preferences selected for use with this second aspect of the invention, it is preferable that the system further include some means for projecting a light pulse toward the objects; and some means for receiving a reflected light pulse from the objects. Here it is also preferable that the generating means include means is for generating the measurement signal in response to the received light pulse.

In preferred embodiments of its third major independent facet or aspect, the invention is a lidar system. It includes some means for generating an at-least-one-dimensional measurement signal corresponding to an at-least-one-dimensional received lidar-beam pulse.

This system also includes some means for time-resolving the measurement signal. In addition it includes multiple memory elements, include a dynamic RAM ("DRAM") or other capacitive array.

These memory elements respectively receive and hold time-resolved measurement-signal portions substantially directly from the resolving means. The system also includes some means for reading the held measurement-signal portions from the memory elements.

The foregoing may represent a description or definition of the third aspect or facet of the invention in its broadest or most general form. Even as couched in these broad terms, however, it can be seen that this facet of the invention importantly advances the art.

In particular, such direct connection from the resolving means of this aspect of the invention to the memory elements will eliminate need for an intermediate isolating stage (such as passage through the optical domain as described above for the second main facet of the invention). This will make the overall system extremely efficient, compact and low in power consumption.

Multiple memory-element devices of the DRAM or other capacitive-array type are expected to become commercially available very soon, under the impetus of the emerging fingerprint-analysis industry. It is anticipated that such arrays will have very high numbers of units per package, consistent and well-controlled capacitance, high speed, low cost and other characteristics that will enhance direct connection as described above.

Although the third major aspect of the invention thus significantly advances the art, nevertheless to optimize enjoyment of its benefits preferably the invention is practiced in conjunction with certain additional features or characteristics. Preferably the system further includes multiple buffer switches transferring the time-resolved measurement-signal portions from the resolving means substantially directly to the multiple memory elements respectively. Each of the buffer switches has a respective enable terminal actuated by the resolving means.

As in the first facet of the invention the system preferably further includes some means for projecting an at-least-one-dimensional light pulse toward the objects; and some means for receiving an at-least-one-dimensional reflected light pulse from the objects. The generating means include means for generating the measurement signal in response to the received light pulse.

In preferred embodiments of its fourth major independent facet or aspect, the invention is a lidar system. The system includes some means for generating a measurement signal corresponding to a received lidar-beam pulse.

It also includes a delay line that accepts successive portions of the measurement signal. The system also includes some means, within the delay line, for advancing successively accepted signal portions farther into the delay line.

Also included are some means for reading multiple measurement-signal portions substantially simultaneously from multiple positions along the delay line. The foregoing may represent a description or definition of the fourth aspect or facet of the invention in its broadest or most general form. Even as couched in these broad terms, however, it can be seen that this facet of the invention importantly advances the art.

In particular by applying a measurement signal directly to a delay line, and then reading measurement-signal portions out of the delay line for storage or use, the system tends to reduce the need for extremely rapid readout to following stages. Instead the readout from all the elements of the delay line can be performed relatively more slowly—for example, after the entire reflected pulse has been collected.

Although the fourth major aspect of the invention thus significantly advances the art, nevertheless to optimize enjoyment of its benefits preferably the invention is practiced in conjunction with certain additional features or characteristics. In particular, preferably the system further includes multiple memory elements receiving the portions of the measurement signal substantially directly from the multiple positions along the delay line.

Such multiple memory elements, if present, most preferably take the form of a dynamic RAM or other capacitive array. Another preference is that the delay line take the form of a shift register, and that the memory elements receive the successive measurement-signal portions from successive stages of the shift register. In this case the reading means include parallel circuits for reading plural measurement-signal portions substantially simultaneously from the shift register to the memory elements.

Another basic preference is that the system also include an analog-to-digital converter ("ADC"), digitizing the successive measurement-signal portions for application to the shift register. In this case preferably both the ADC and the shift register are plural-bit devices, enabling the fundamental measurements to be made and recorded with substantial bit depth.

Also preferably the shift register is a CMOS device. A so-called "sample & hold" delay line is particularly preferable to minimize the number of separate components and stages.

Another preference is that the system still further include multiple buffer switches transferring the measurement-signal portions from the delay line substantially directly to the multiple memory elements respectively. In this case each buffer switch has a respective enable terminal that is actuated by a read signal—after generation of the measurement signal is substantially complete.

The system advantageously is for detecting and ranging objects, and accordingly further includes some means for projecting a light pulse toward the objects; and some means for receiving a reflected light pulse from the objects The generating means, in this event, include means for generating the measurement signal in response to the received light pulse.

In preferred embodiments of its fifth major independent facet or aspect, the invention is a method for making three-dimensional images of a volume, and features in the volume. This method uses a two-dimensional array of multiple discrete photosensitive detectors and electronic circuitry connected with said detectors.

The method includes the step of directing a two-dimensional lidar pulse, reflected from the volume and features, to the array of multiple discrete photosensitive detectors. Another step is generation of a corresponding two-dimensional array of multiple discrete electronic signals by the array of detectors.

Also included is the step of passing the entire resulting array of signals from the photosensitive detectors to the electronic circuitry. A further step is operating the electronic circuitry to time-resolve the entire array of signals, thereby generating a three-dimensional electronic image of the features.

The foregoing may represent a description or definition of the fifth aspect or facet of the invention in its broadest or most general form. Even as couched in these broad terms, however, it can be seen that this facet of the invention importantly advances the art.

In particular, this method can (but does not necessarily) provide an entire three-dimensional electronic image of a complete volume, based on just one single lidar pulse. Moreover, because the entire electronics package can be solid-state and largely digital devices, for the first time such equipment can be made light, compact, and relatively economical—and also low in power consumption and heat generation.

Although the fifth major aspect of the invention thus significantly advances the art, nevertheless to optimize enjoyment of its benefits preferably the invention is practiced in conjunction with certain additional features or is characteristics. In particular, preferably the operating step does in fact include generating the entire three-dimensional electronic image of the features from substantially a single lidar pulse.

Another preference is including the step of—before the directing step—projecting a two-dimensional lidar pulse toward the volume and features, to create the reflected two-dimensional lidar pulse. Still another step is to include the step of—after the operating step—using the three-dimensional image as a three-dimensional representation of the features in the volume. This using step is not necessarily immediate: it can instead include first storing the three-dimensional electronic image; and later recovering the stored image for later use as said three-dimensional representation of the features.

In preferred embodiments of its sixth major independent facet or aspect, the invention is a system for forming a three-dimensional image of a volume, and features in the volume. The system includes a two-dimensional array of multiple discrete photodetectors.

This detector array receives a two-dimensional lidar pulse reflected from the volume and the features. In response the detector array generates a two-dimensional array of corresponding discrete electronic signals.

The system also includes a two-dimensional array of multiple discrete electronic circuits connected to receive the array of signals from the detector array. The circuits include some means for time-resolving the entire array of signals, to generate from the pulse a three-dimensional electronic image of the features.

The foregoing may represent a description or definition of the sixth aspect or facet of the invention in its broadest or most general form. Even as couched in these broad terms, however, it can be seen that this facet of the invention importantly advances the art.

In particular, this apparatus form of the invention is closely related to the fifth, method, facet of the invention and shares the same fundamental advances.

Although the sixth major aspect of the invention thus significantly advances the art, nevertheless to optimize enjoyment of its benefits preferably the invention is practiced in conjunction with certain additional features or characteristics. In particular, preferably the system further includes an optical source, which projects a two-dimensional lidar pulse toward the volume and the features, to create the reflected two-dimensional lidar pulse.

A group of preferences relates to choice of the type of photodetector used. One such preference is that they include avalanche photodiodes (APDs).

Another is that the detectors include positive intrinsic negative (PIN) photodiodes. Yet another is that they include indium gallium arsenide detectors.

Still another is that they include a charge-coupled device (CCD) array. These choices are not necessarily mutually exclusive, as the detector array can include more than one type—for example in different regions of the detection field.

Another group of preference relates to the choice of electronic circuits. These may include a two-dimensional array of transimpedance amplifiers (TIAs) connected to receive the signal array from the detectors and to drive the time-resolving means.

A different possibility is that the electronic circuits include a two-dimensional array of operational amplifiers (op-amps) configured for low-noise transimpedance signal gain. These op-amps are connected to receive the signal array from the detectors and drive the time-resolving means.

Still another option is that the circuits include a two-dimensional array of transmission lines connected to receive the signal array from the detectors, respectively; and a two-dimensional array of microwave amplifiers fed by the transmission lines, respectively. The transmission lines are connected to drive the time-resolving means.

A further group of preferences addresses the makeup of the time-resolving means. These may include—for handling successive segments of the electronic signal from each detector—a respective array of buffer amplifiers; together with a respective array of time-controlled switches connected to actuate the buffer amplifiers.

An additional preference in this case is that the system also include a respective array of programmable logic circuits generating time-base control signals to operate the switches. Alternatively the system preferably includes a respective array of delay lines generating time-base control signals to operate the switches.

Another preference is that the time-resolving means incude—again for handling the electronic signal from each detector—a respective array of vertical-cavity surface-emitting lasers (VCSELs). The VCSELs sample successive segments of the electronic signal from each detector. A respective array of range-bin memory elements is connected to receive and integrate signal samples from the VCSELs.

Still another preference is that the system also include a handheld portable case. The case encloses and carries substantially the entire photodetector array and the electronic circuits.

As mentioned earlier, certain of the four main independent facets or aspects of the invention are advantageously employed in combination together, to maximize enjoyment of their respective benefits. All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

Figure 1:
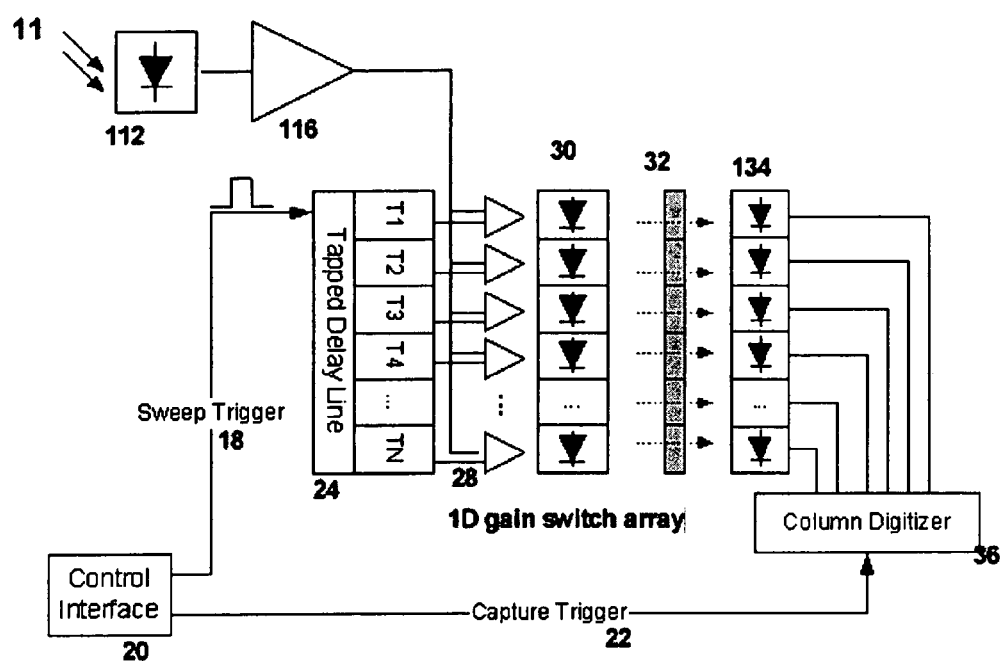
FIG. 1 is an elevational view of a single-pixel receiver element according to a preferred embodiment of the invention that employs VCSEL converters following a time-resolution stage.

Details of one preferred embodiment according to the invention include:

1. a detection photodiode 112 (FIG. 1),
2. a transimpedance amplifier (TIA) 116,
3. a tapped delay line 24,
4. a vertical-cavity surface-emitting laser (VCSEL) 30, and
5. an image photodiode 12.

Detection Photodiode

This element 112 generates a measurement signal 11. The device can be, merely by way of example, an avalanche photodiode (APD) or positive-intrinsic-negative photodiode (PIN).

A difference between the two is that the APD can have significant gain, acting as a photomultiplier, and the PIN cannot. Gains exceeding one hundred are common for the APD.

A disadvantage of the APD, however, is that its gain comes at the expense of good noise performance—a typical noise factor being five (i.e., five times worse than shot-noise-limited performance). Furthermore, the APD requires relatively high voltages for operation.

As a result of its gain capability (and the associated semiconductor structures), the APD is not readily combined with other semiconductor devices on a single die. These several negative factors may strongly motivate alternative designs that can use a PIN photodiode instead of an APD.

The PIN photodiode does not mandate high voltages, but values on the order of 10 V are relatively common—to help reduce diode capacitance, for bandwidth optimization. The PIN is more easily integrated with other technologies, and available in array format.

APDs and PINs have similar quantum efficiencies, for given semiconductor material. Hence a real issue to face in designing a suitable PIN-based detector 12 is that of obtaining gains equivalent to the APD, but equal to or better noise performance. (Equivalent noise performance is still significant when integration and scaling are considered.)

The accepted (and now best) way to obtain gain with a PIN is to use the same gain stage that would be used for an APD. Such a stage includes an op-amp 16 configured for transimpedance gain, or a transimpedance amplifier (TIA) 116.

Transimpedance Amplifier (TIA)

In preferred embodiments, a TIA 116 (FIG. 2) is used to feed a digitally swept time-resolving subsystem. The TIA is implemented using an op-amp 16. (The noninverting case can be substituted, with a slight loss of bandwidth.)

The TIA 116 is an op-amp 16 configured to amplify a current signal while using it to develop a corresponding voltage; hence the name. The TIA 116 can be customized to meet specific needs or uses of the system. Principal areas of customization for the TIA 116 are:

a. minimizing the impact of the photodiode capacitance through selection of applied bias voltage, or through isolation of the corresponding op-amp 16 input using an active element such as a common-base field-effect transistor (FET);

b. optimizing gain and overall bandwidth through the selection of op-amp 16 feedback resistance and capacitance, taking into consideration the input capacitances of both the photodiode and op-amp, and also the output impedance expected looking into the load 38; and c. optimizing noise performance by trading gain and bandwidth for noise figures, taking into account the voltage and/or current noise referred to the op-amp 16 input (these are often specified for an op-amp 16—at least one or the other of voltage or current equivalent noise, in per root-hertz units).

As to point "a" above, the goal—in terms of net input capacitance presented to the op-amp 16 input—is to maximize the bandwidth available for the TIA 116.

Depending on the specific application, greater emphasis may be placed on minimizing noise or maximizing gain; hence some application-specific tuning of the system design ("customization") will occur. Here an op-amp 16 circuit (FIG. 2) from the Texas Instruments (TI) OPA686 datasheet was used (see www.ti.com for more information on this unit).

A primary concern is typical noise floor and bandwidth performance. For exemplary discussion the OPA686 is helpful as it has served well in a prototype of a preferred embodiment. This component has low noise (approx. 1 nV/√Hz) and high gain bandwidth (1600 MHz).

Added noise for the inverting TIA 116 is a function of the noninverting input-current noise $I_n$, the input-voltage noise $V_n$, the feedback resistor $R_f$, and the diode capacitance $C_d$, which for simplicity also includes the input capacitance of the op-amp 16. The compensation capacitor is chosen for bandwidth and stability, but does not directly affect noise performance. Input-referenced added-noise current for this TIA 116 is:

$$I_{eq} = \sqrt{I_n^2 + 4kT/R_f + (V_n/R_f)^2 + 0.33(2\pi V_n C_d f)^2},$$

where f is the output bandwidth of the amplifier 16. This current is a function (FIG. 3) of output bandwidth for the settings $C_f$=0.8 pF, $R_f$=10 kW and $C_d$=50 pF. For example this yields an equivalent input-noise current of 9 pA/√Hz at 37 MHz output bandwidth—which at the same 37 MHz input bandwidth results in a noise current of 55 nA.

Cast in terms of the input-referred current noise, the minimum detectable signal 11 is then some multiple of the equivalent current noise. This is easier to conceptualize if cast in terms of power. To put this into context, assume that, as for streak-camera 170 applications, a minimum detectable return is on the order of one hundred photoelectrons ("100 e$^-$"). For a transmitted pulse 82 of 10 ns ($10^{-8}$ sec) width, this would imply a current of:

$$I_{pulse} = 100 e^- \cdot 1.6 \cdot 10^{-19} C/e^-/10^{-8} \text{sec} = 1.6 \cdot 10^{-9} A = 1.6 \text{ nA}.$$

Using the above amplifier configuration, these thoughts suggest that the noise for the 37 MHz TIA 116 is more than thirty times higher than a 100 e$^-$ signal for an equivalent streak-camera response. From this it is clear that, even working with a high-performance op-amp 16, obtaining wide bandwidth and low-noise gain is a challenge.

Figure 17:
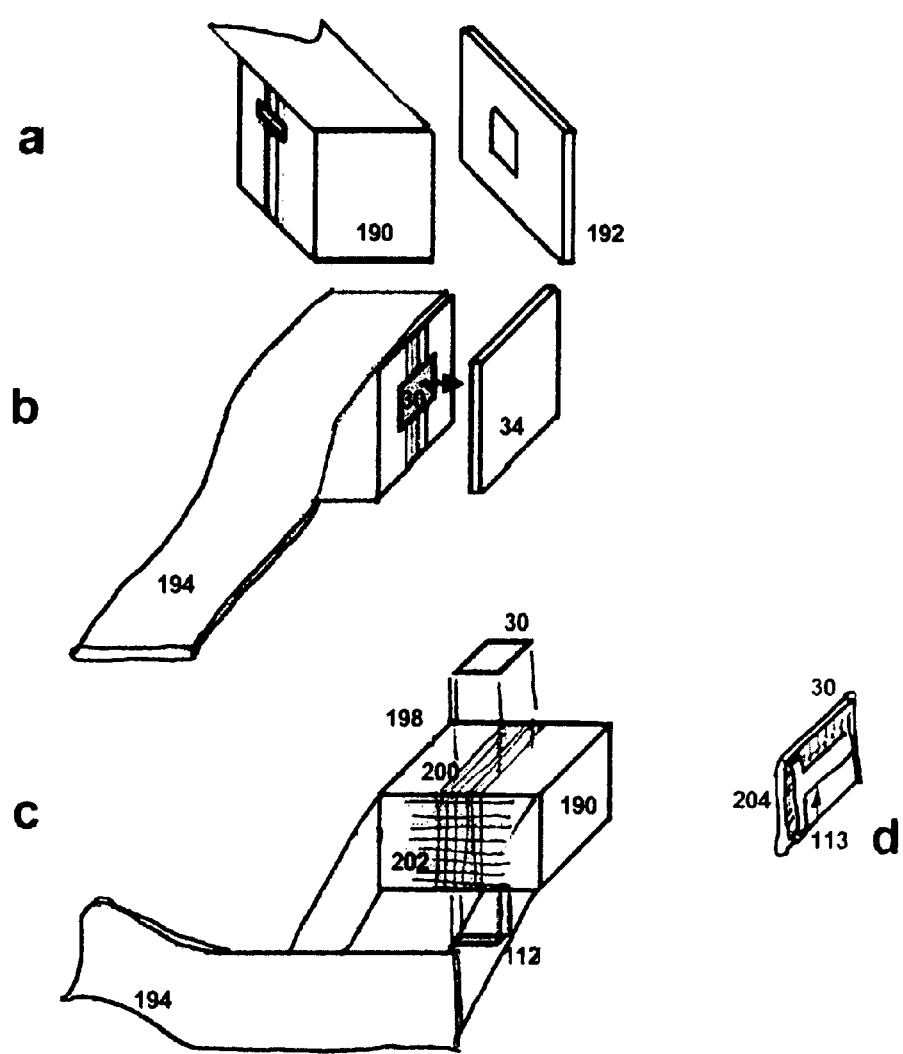
FIG. 17 is an elevational view of optimized components of a preferred embodiment of the invention, (with closer views shown in b through d)
Figure 18:
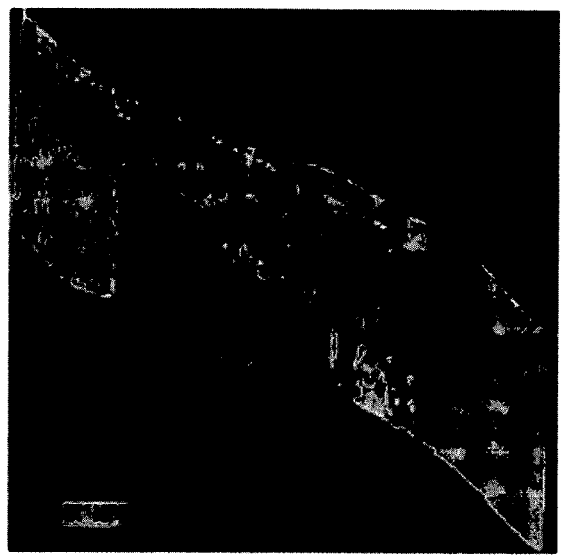
FIG. 18 is a photograph of prior-art airborne STIL data: a geodetically registered 3D map of power lines over a local depression with canopy, and a grove of fruit trees visible at lower right (2000, Oxnard, Calif.; 9 ns NdYag laser)—these types of images, too (as well as those in FIGS. 19 through 22) being obtainable with preferred embodiments of the present invention.
Figure 19:
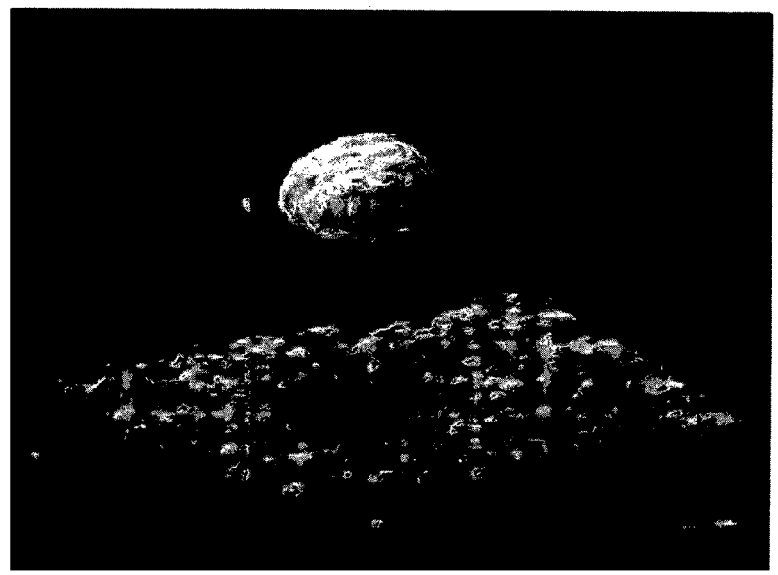
FIG. 19 is a like photo of a prior-art airborne 3D image of a 15×17 m school of fish in 35 m of water.
Figure 20:
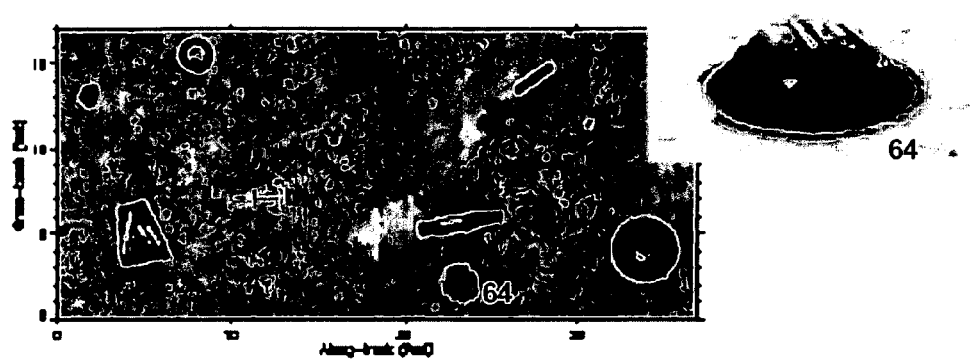
FIG. 20 is a like image of an underwater-vehicle contrast map of a bottom scene with test objects; a 3D rendering of a manta-mine-like object in the lower-right portion of that image is rendered in the separate image to the right.
Figure 21:
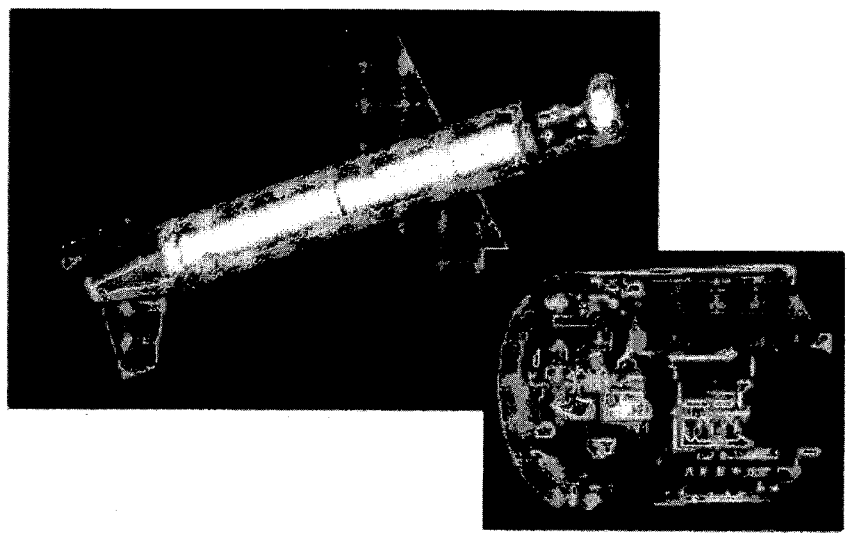
FIG. 21 is a group of like images of a prior-art STIL system autonomous underwater vehicle (AUV) for underwater towed-vehicle imaging.
Figure 22:
FIG. 22 is a like image of a prior-art STIL technology demo for industrial measurement; sub-millimeter resolution 3D image of ping-pong ball over a support platform; 3D wire-frame data generated with STIL sensors were overlaid on a 3D model of the ball.
Figure 23:
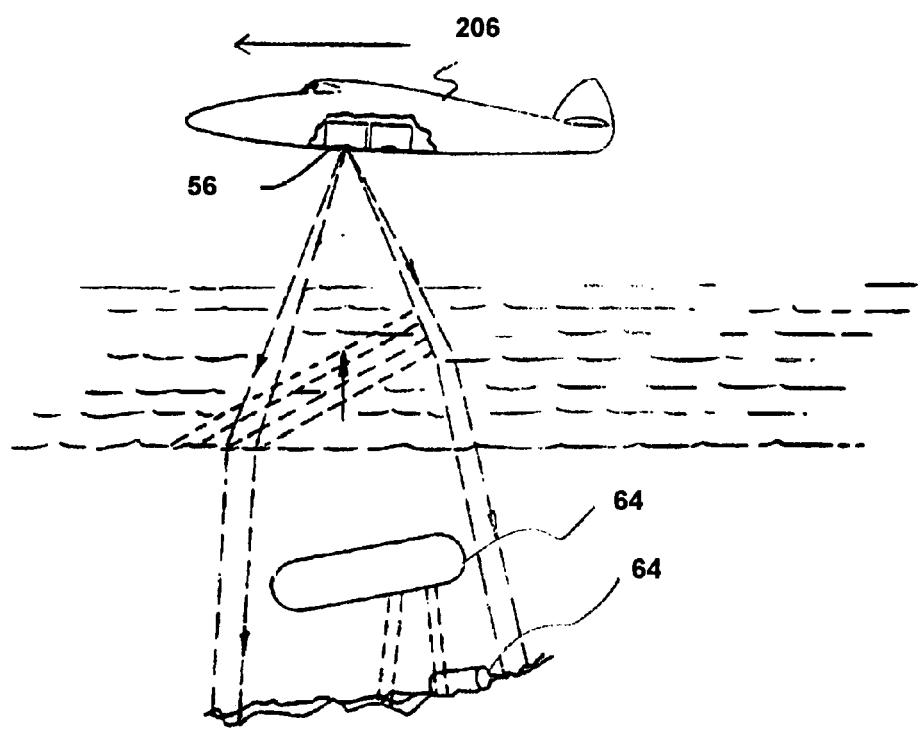
FIG. 23 is an elevational view of a prior art STIL system on a moving platform as it views underwater objects.
Figure 24:
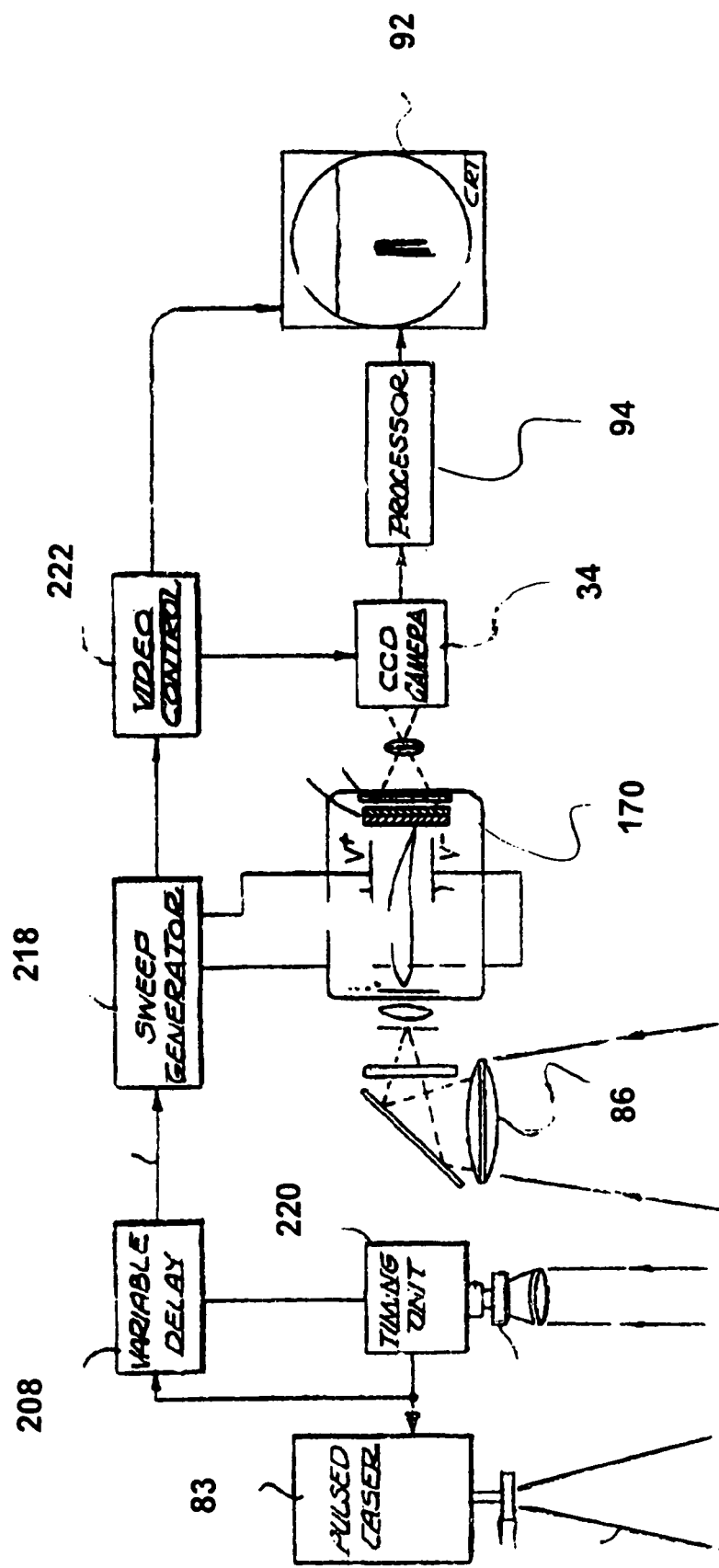
FIG. 24 is a combination of an elevational view and a block diagram of prior-art STIL technology.

Fortunately, this is a problem that has been addressed significantly—but for wholly different applications and marketplace—by existing photonics companies. For instance Analog Modules (see www.analogmodules.com) has a commercially available photodiode-TIA module that has been optimized for packaging and component selection to provide wide bandwidth and low-noise transimpedance gain (FIG. 17). This part, the P/N 713A-7, delivers up to 200 MHz bandwidth at 18 V/mW input voltage and 8 pW/√Hz, using an InGaAs PIN photodiode with 12 V applied bias.

For ease of comparison with other results discussed here, it may be helpful to express the noise power in terms of noise current. The power specifications can be converted to current with a few assumptions. If it is assumed (as many Analog Modules application notes assume) that a 50 Ω output impedance is nominal, then 8 pW at the output can produce 400 nA into 50 ohms, or 20 μV across that same output load 38.

Figure 2:
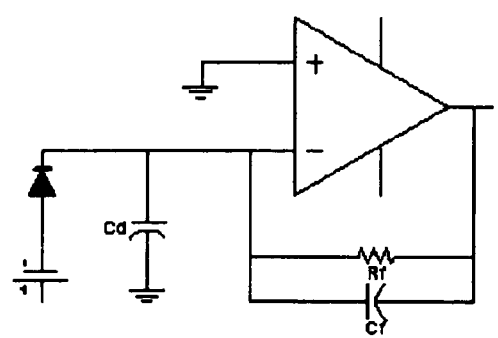
FIG. 2 is a circuit diagram of a photodiode and TIA for wideband performance with low-noise gain, according to a preferred embodiment of the invention—which may be but is not necessarily the FIG. 1 embodiment.

Using the inferred 20 kΩ feedback gain (from datasheet notes), this implies input current of 1 nA. The 8 pW/√Hz thus becomes 1 nA/√Hz equivalent input-current noise. For these assumptions, such a low noise figure represents a significant improvement over the stock-configuration TI transimpedance design (FIG. 2).

Figure 3:
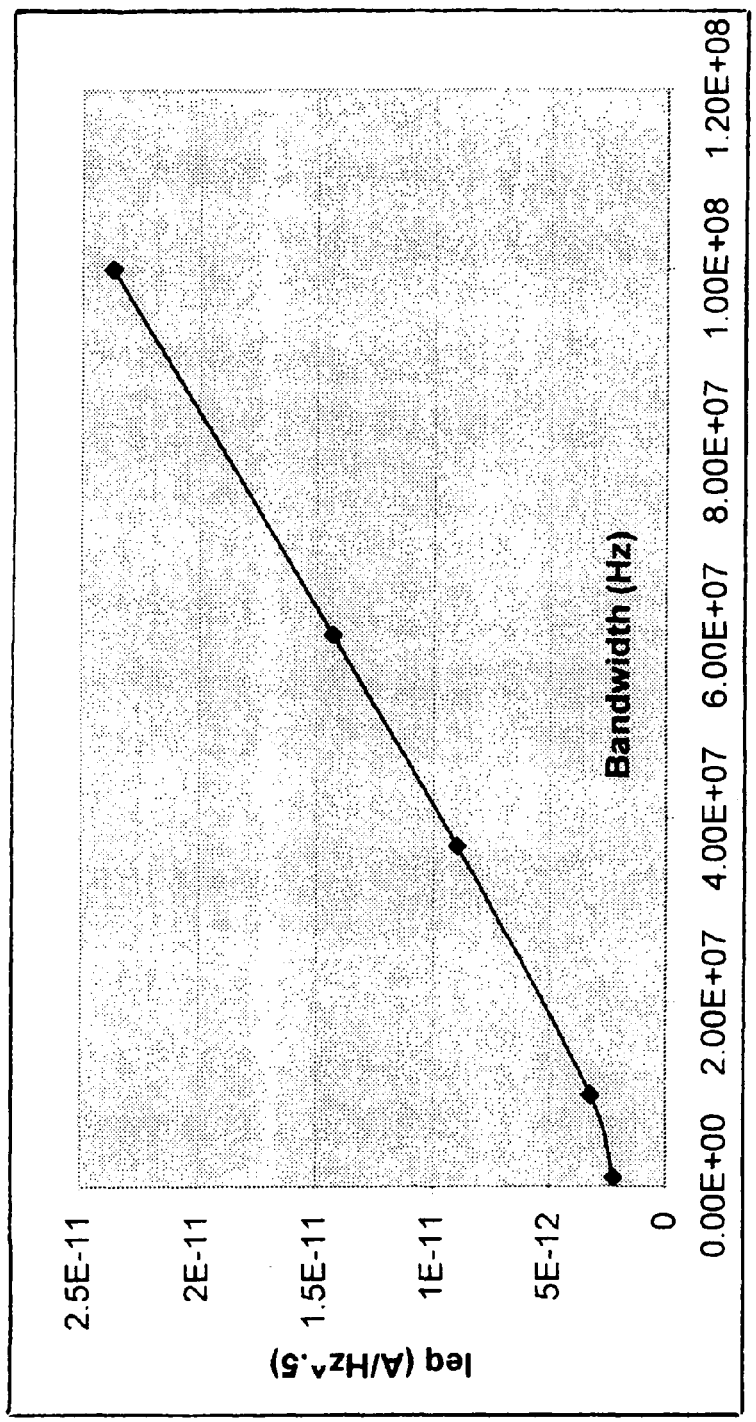
FIG. 3 is a graph of calculations for equivalent input noise-current density as a function of input bandwidth, in the FIG. 2 embodiment.

A front-end receiver/system based on the photodiode-TIA module made by Analog Modules has been demonstrated and is further described herein (FIG. 3). Several preferred embodiments encompass alternative front-end stages that will be straightforward, for workers skilled in this field, in view of the introduction in this document.

An example of one such approach is to direct the output of the diode to a transmission line that feeds a microwave amplifier 14. The noise-limited performance in this case is just a matter of determining the desired bandwidth and the noise figure of the amplifier. Minimum detectable signal for a microwave amplifier 14 is given by—

$$M_{EDS} = kTBF,$$

where F is the amplifier noise figure, T the physical temperature, k Boltzman's constant and B the bandwidth in hertz. For instance, at 300 K and 100 MHz bandwidth, and using an amplifier 16 with a noise figure of 3 dB (10 log F), the MDA is:

$$M_{EDS} = 8.28 \cdot 10^{-13} W = -91 \text{ dBm } (dBm \text{ is } dB \text{ with respect to } 1 \text{ } mW).$$

This translates to a minimum detectable current and voltage (at 50Ω input impedance) of—

$$I_{min} = \sqrt{M_{EDS}/Z} = \sqrt{8.28 \cdot 10^{-13}/50} = 1.3 \cdot 10^{-7} \text{ A} = 130 \text{ nA}$$

$$V_{min} = \sqrt{Z \cdot M_{EDS}} = 3.9 \cdot 10^{-6} \text{ V, or } 3.9 \text{ μV.}$$

This analysis explains why it is not common practice to connect a low-noise microwave amplifier 14 to a diode and hope that it will work. It also suggests, however, that there is a trade space in which to work, provided some customization is introduced—and the present inventors have confirmed this suggestion.

Figure 4:
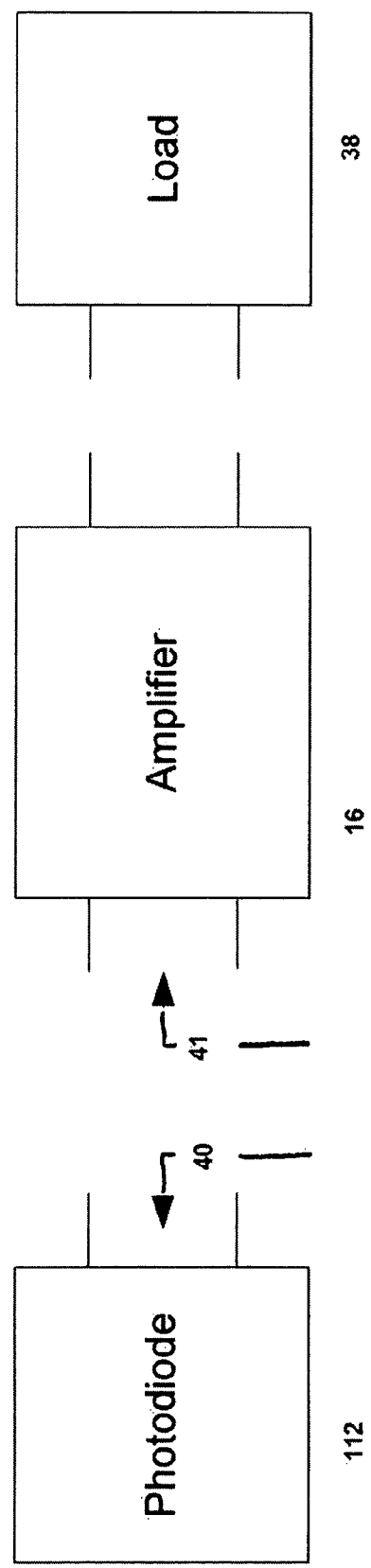
FIG. 4 is a basic block diagram of a preferred embodiment for optimizing detection.

Specifically, as the noise figure depends on the impedance match between current source and amplifier 16 at 50 Ω, with associated assumptions about the real part of that impedance, there is generally room to make tradeoffs. This amounts to optimizing the amplifier input impedance ($Z_{amp}$) 41 (FIG. 4) to yield the lowest noise figure when the unit is connected to a photodiode characteristic impedance ($Z_{pd}$) 40.

This approach, used earlier for telecommunication applications, has been validated for use with the present invention. Nevertheless the circumstances are different enough (essentially coherent detection) that many of the assumptions are less applicable to the invention; hence the theory outlined bears reanalysis—even notwithstanding success in actual operation by the present inventors.

Tapped Delay Line

As noted earlier, the system requires some means for time-resolving the digital signal. In preferred embodiments of the invention a digital sweep is applied to control the distribution of successive signals 11.

Initially it was thought that a traditional analog tapped delay line 24 could be used to directly feed a VCSEL 30 array—with some help from so-called buffer "enables" (i.e., forward-transmission enabling terminals) and the like is in the VCSEL drive circuit. Such configurations remain of interest for specific applications, as will occur to artisans skilled in this field.

Working with typical analog tapped delay lines 24, however, is relatively clumsy—as those devices tend to be tuned for very specific delays, and use passive/reactive circuit elements to provide delay. Active tapped delays, on the other hand, are much more focused on digital applications, and so have less utility for this necessarily hybrid system.

A preferred solution is to use programmable logic, in combination with analog switches, to realize the purpose of a tapped delay line 24. These switches are implied (FIG. 1) in terms of the "enables" associated with the buffers that drive the VCSEL elements. Instead of replicating the signal 11 across many outputs of a tapped delay line 24, however, a delayed version of a narrow control/gate pulse is generated across many outputs of a programmable logic device (e. g., field-programmable gate array FPGA) and used to gate the enables on the VCSEL drive buffers 50.

Using this approach makes use of standard logic designs and also enables the use of traditional semiconductor switch technology that can be implemented as a gain enable, precluding the need for relatively exotic analog tapped delay lines.

Because noise statistics are already set by front-end electronics (cascade amplifier noise figures are dominated by the noise figure of the first gain stage), the principal concern with the tapped delay line 24 and associated switches 26 is the switch rise-and-fall time. Good analog switches, such as the SN74LVC2G66 by TI, have nanosecond-class rise-and-fall times.

That TI unit, for instance, has switching times in the range of 1 to 5 ns, depending on drive voltage and rail voltage for the part. This has the effect of limiting the temporal sampling and overall bandwidth of the receiver as well. If for example the switch temporal behavior is treated as a Gaussian with 5 ns width, the equivalent bandwidth will be approximately 73 MHz.

In another preferred embodiment, the delay line 24 has clock signals serving in lieu of a digital sweep signal. The delay line 24 responds to the clock signals by successively advancing the successively received signals into and along the delay line itself.

In other preferred embodiments dynamic RAM 88 or another capacitive array receives the successive measurement signals distributed by clock signals. Additionally, some preferred embodiments include use of a shift register as the delay line wherein the memory elements take on successive positions within the shift register and the multiple signals 11 are read substantially simultaneously using parallel circuits.

Vertical-Cavity Surface Emitting Laser (VCSEL)

In preferred embodiments, distribution of the digital signal can be controlled using a VCSEL. In one example according to a preferred embodiment of the invention, the VCSEL element of the receiver will be assumed similar to a Honeywell SV3644-001 discrete VCSEL, as this unit is a visible-wavelength output component that has been successfully used.

As its characteristics are quite close to many published data available for VCSELs, using this component as a representative of VCSELs generally will not introduce significant error. Technical specifications of interest for this Honeywell VCSEL are: 673 nm output, 2 V threshold voltage, and 2 mA threshold current. It can be driven above threshold, by as much as 4 to 10 mA, leading to a 0.12 to 0.30 mW output-power range.

The modulation bandwidth of VCSELs is generally very high, extending beyond several gigahertz when the VCSEL is modulated about some above-threshold quiescent point. Thus, the VCSEL is band-limited only to the extent that its driver circuit is in that mode.

The temporal response for bringing the VCSEL from below threshold to above threshold is somewhat slow for multigigahertz telecom applications (J. Tatum, J. Guenter, *Modulating VCSELs*, Honeywell Application Sheet, 1998). At less than 1 ns, however, it is fast enough for the systems being considered here.

Thus, even switching the VCSEL completely off via its bias 52 control will not introduce bandwidth limitations over those introduced by the TIA 116. For instance, if a 2 ns overall transient response is used (1 ns rise, 1 ns fall), then the equivalent bandwidth for the VCSEL drive circuit will be 183 MHz.

Thus, while there is no immediate frequency limitation for the VCSEL electronics, potential noise sources should be considered in realizing a VCSEL-based receiver:

1. slope efficiency noise—The slope efficiency of the VCSEL, which is a conversion gain parameter, is approximately 0.6%/C; thus small changes in temperature have a noticeable effect on gain. This is most likely to be a dynamic-range issue more than a signal-to-noise-ratio issue, owing to the likely high thermal mass of the diode relative to the time scales of a single image/pulse event.
2. impedance noise—As with slope efficiency, the change in impedance of the diode will vary with temperature, approximately 0.3%/C. This is also likely to be a slowly varying phenomenon, but will need to be controlled or monitored, or both, to help with dynamic range.
3. off-state bounce—For telecom applications, when a square pulse is applied to the VCSEL, there can be a trailing edge "bounce" that is some small fraction of the pulse height. This may be an impedance mismatch issue, but should be kept in view during any system development. The impact is likely to show up as amplitude noise on the output-detector 12 element associated with a particular VCSEL.
4. relative intensity noise (RIN)—The RIN value for a VCSEL is less than −125 dB/Hz. The RIN is caused by is coupling of spontaneous emission from the laser into the stimulated emission, introducing variation in optical power for particular combinations drive voltages or currents. For the bandwidths in preferred embodiments operating below 100 MHz, this is not a concern.

Hence neither bandwidth nor signal noise is an issue of concern for the VCSEL, assuming adequate signal to modulate the VCSEL. The VCSEL does, however, impact the dynamic range of the system and may present a challenge to be addressed by customizing the system.

VCSELs can present a challenge for dynamic range because the minimum and maximum output light levels above threshold are both very bright, and not separated by even an order of magnitude—if used in the way VCSELs are typically used for telecom applications. Usually, the VCSEL is biased on at some quiescent current, and modulated about this point.

For preferred embodiments of the present invention, to the contrary, the VCSEL must be off when signal 11 is not present—so that above-threshold operation occurs only when a backscattered pulse 82 generates the appropriate signals. If this is not the case, then fairly quickly (in the submicrosecond domain) the output photodiode saturates: the full-well condition, for instance may only be 100,000 e⁻ for a CMOS detector 134.

Thus, one challenge in using VCSELs is to bias them just below threshold, and bring them above threshold only when the desired signal is expected. This is best facilitated using the same programmable logic that provides the tapped delay-pulse signals for gating the VCSEL switch/buffer 50.

By adding two digital control signals, the bias is readily controlled. One signal, the bias enable, occurs just prior to the VCSEL enable 52 pulse (the tapped delay signal) and releases just prior to the falling edge of the VCSEL-enable 52.

Figure 5:
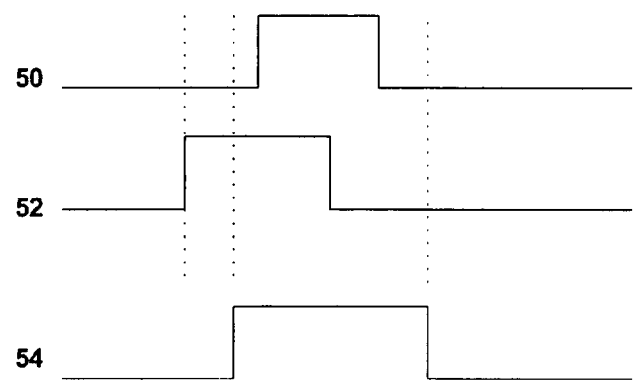
FIG. 5 is a timing diagram for the FIG. 1 embodiment, particularly providing an example of VCSEL and photodetector timing control.

The other signal controls integration of the final photodiode detector 112, dumping charge from a given detector 12 (FIG. 5) until just prior to the bias enable, and extending just beyond the falling edge of the buffer enable. The VCSEL and photodetector 12 timing control thus cooperate to provide optimum dynamic range.

Figure 6:
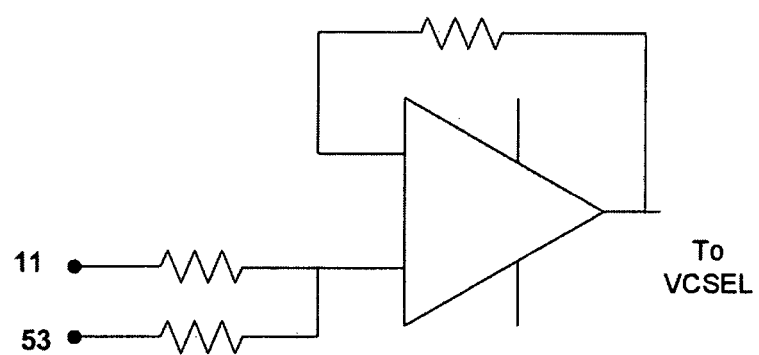
FIG. 6 is a circuit diagram of a preferred VCSEL drive (e.g. for the FIG. 5 embodiment), wherein a separate bias and signal output are incorporated for holding the VCSEL just below threshold before ranging.

A conceptually direct way to combine the bias and signal inputs to the VCSEL is to use a summing junction of a noninverting op-amp 16 (FIG. 6). If the digital signals are stable enough, it is possible to add the VCSEL buffer-enable 50 to this driver—or to use the bias control 53 itself as the enable, thereby simplifying the overall circuit.

For a new implementation by the reader of this document, these approaches should be tested and evaluated in the prototype phase. This is not necessarily the most highly preferred circuit method in terms of scalability, since a discrete transistor amplifier 16 may be a better choice for each control point. The approach, however, is conceptually correct and provides a means of control for a single pixel prototype.

To mitigate temperature effects, either the temperature often must be held constant or some measurements of VCSEL characteristics must be captured between pulses 82 and then used to adjust system parameters. For instance, it may be necessary to alter the VCSEL bias 53 set-voltage as a function of time, to maintain closeness to threshold conditions.

Image Photodiode

The image photodiode may be a CMOS detector 134 (FIG. 6), or can be any of several available imaging sensor alternatives, including CCD 234 devices. A fairly high performance CMOS photodetector 134 to use as an example is the IBIS4 sensor used in Seacam.

This component, according to its datasheet, has pixels with 50,000 e⁻ full-well capacity, dark current of 787 e⁻ and an associated dark-current noise of 20 e⁻. Clearly, with such a small full-well capacity, the VCSEL control mentioned above is vital for achieving a useful dynamic range.

For instance, if the VCSEL is run for a typical streak-camera sweep duration of 1 μs, at the midrange VCSEL output of 0.21 W the well attempts to accumulate 360 Me⁻. This represents an absurd saturation condition.

As to noise sources: dynamic range is set by the dark current/noise and the analog-to-digital converter (ADC) that is used. Most likely, given the constraints on dynamic range that the VCSEL ordinarily imposes, even an 8-bit converter preserves the available postVCSEL dynamic range. Issues associated with noise, bandwidth and dynamic range for each component in the signal chain are readily analyzed (Table 1).

Representative values can be stated (Table 2) for a commercially available point design of a front end according to preferred embodiments of the invention, based on the following components: Analog Modules 700 Series, Xilinx (e. g. model number XC9528), TI (e. g. OPA686), Honeywell red VCSEL, model SV3644-001 (or for visible operation the Avalon AP850), and a Fillfactory model IBIS4 CMOS array 134.

Experimental results (FIG. 3) have been acquired for point design based on an airborne lidar application with APD. These represent a terrestrial-target 64 case at 532 nm, using the Hamamatsu Si-APD.

The indicated threshold level of 213 nW corresponds to a voltage output of about 53 mV using the $2.5 \cdot 10^5$ V/W sensitivity specified in the Hamamatsu data sheet. The voltage corresponding to the noise-equivalent power (NEP) is 9.7 mV and to the 90% probability-of-detection (POD) signal level is 81.9 mV.

One limiting factor for preferred embodiments of the invention is that of front-end analog bandwidth, and the noise spectral density in this band. The streak camera 170 is able to achieve many gigahertz of analog bandwidth with shot-noise-limited performance, whereas current commercially available transimpedance amplifiers 116 suited for preferred embodiments of the present invention are limited to a few tens of megahertz—for the highest sensitivity applications.

This range can be extended through customization, as described above and shown in the experimental results (FIG. 3). Thus limits can be extended with customization through selection of optimal components and settings.

Given the relatively high sampling rate provided by the back-end electronics, however, it has been found that the front-end analog bandwidth can be reduced without sacrificing system performance. For example, the required bandwidth for a 10 ns pulse such as that used for the demonstration STIL system 56, is 37 MHz. Using a back-end sampling of 500 MHz (2 ns switching speed) this seemingly low front-end bandwidth can yet yield a ranging performance of less than a meter, akin to the subinch performance demonstrated with the STIL using a 10 ns pulse 82—that would, superficially, seem to preclude anything less than meter-scale performance.

Moreover, the invention still has a significant advantage over streak-tube solutions where wavelengths beyond the visible (e. g. 700 nm or longer) or compact solutions (e. g. a few inches on a side) are required. These are features that solid-state technologies typically favor.

One preferred embodiment of the invention characterizes a single-pixel sensor element for demonstration of three-dimensional flash imaging. This embodiment can be scaled-up for multiple pixels to form an N×N array.

Figure 7:
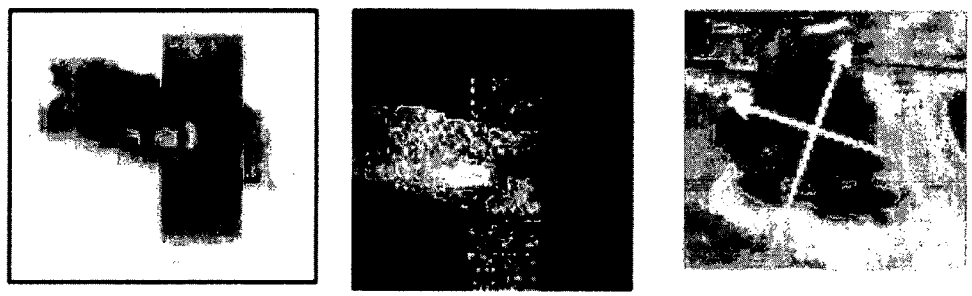
FIG. 7 is a photographic plan of: airborne (helicopter) flash-lidar mosaic imagery of contrast (a) and range (b) for a van parked under trees, further including a conventional photographic image of the scene (c), representing flight lines for the image sequences shown with direction arrows.

A helicopter-borne flash-lidar system has been built and tested to test an N×N array—specifically 64×64. Imagery 92 (FIGS. 7a through c) has been captured using this flash-lidar system in field tests. This system uses multislit 144 streak-tube imaging lidar (STIL) technology, which has been used for imaging objects 64 as small as 1 mm and as large as 100 m in laboratory, industrial, underwater and airborne settings.

As this is based upon streak-tube technology, however, as noted earlier it has fundamental limitations in wavelength sensitivity (visible-light photocathode 108 materials), physical size (vacuum-tube structure) and relative fragility, and the need for custom high-voltage bias and sweep electronics—as well as concerns over the use of electron-tube devices in harsh environments. These limitations preclude the use of MS-STIL flash-lidar systems in applications that require, for instance, infrared (IR) sensitivity and small size or weight, handheld configurations and the like—as is the case for many missile-borne installations.

A preferred embodiment of the technology as part of a lidar system (FIG. 9) uses a short pulse 82, near-infrared (NIR) eyesafe laser 83, projects a fan beam, and forms spatial-temporal 2D images of the backscatter for each pulse 82 transmitted, with the third dimension being added in pushbroom fashion. Here a single 2D image is generated in a video display 92 of the terrain profile 80 imaged with the lidar.

Figure 8:
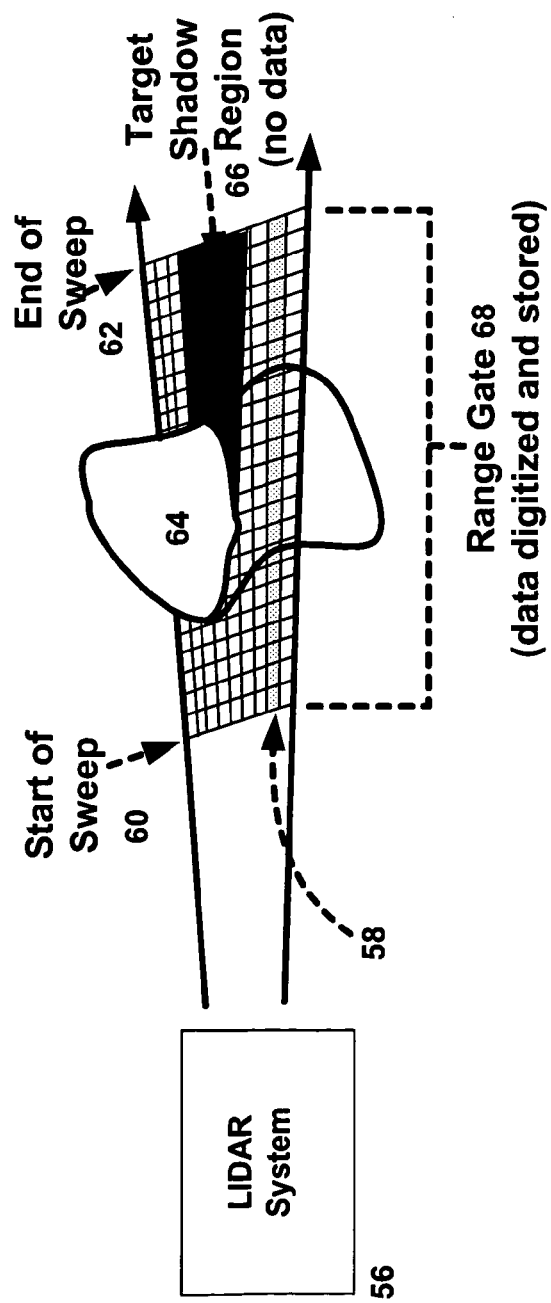
FIG. 8 is an elevational view, partially schematic, of a prior-art STIL transceiver system engaged in a pushbroom sweep over a target—also realizable with preferred embodiments of the present invention.

This lidar geometry (pushbroom, fan-beam) mimics many systems (FIG. 8) currently in use. Even more readily than in streak-tube-based systems, the technology of the invention is extended to a flash-lidar configuration.

In such a system a rectangular area is illuminated with a laser, and the entire rectangular region range-resolved together, thereby leading to a complete 3D image per laser pulse 82 and, if desired, a range-resolved motion picture of the volume of interest. Using the present approach, however, the flash-lidar capability is inherent—it requires no special pixel-remapping optics such as taught in the Alfano and Knight patents, and as is the case for the MS-STIL flash lidar (this will be further explained in a later section).

The next few paragraphs describe preferred embodiments of the invention technology at an elemental level, and then extend the concept to both the pushbroom lidar and flash-lidar cases. Also included is some discussion of the way flash lidar is achieved with conventional streak-tube technology, to highlight some advantages of the present invention.

Figure 10:
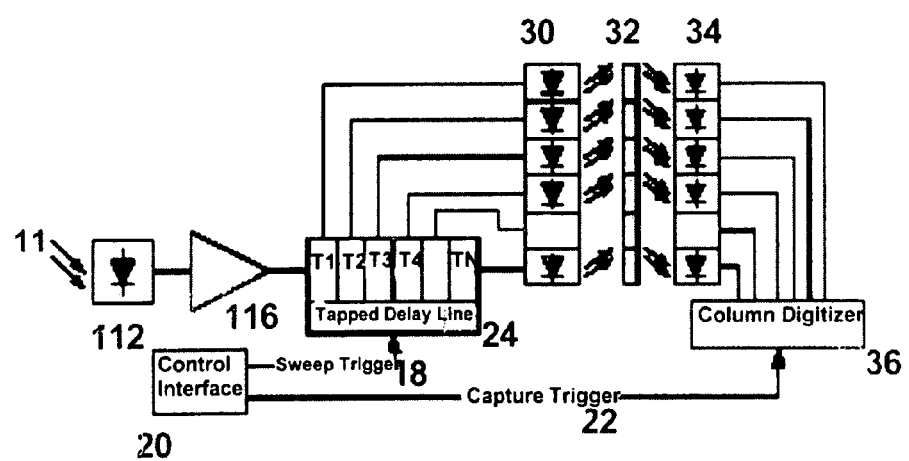
FIG. 10 is an elevational view of a single-pixel receiver element according to a preferred embodiment of the invention.

Additional detail on assembly of a receiver according to the invention, using commercial off-the-shelf available components, can be appreciated from a system conceptual design of a single (spatial) pixel receiver (FIG. 10). A photodiode located at the focal plane 172 of a lidar receiver intercepts photons 84 and converts them to a continuing electronic signal (i.e., a time series).

This signal is then amplified using a transimpedance amplifier 116, so that it can be sampled using a tapped delay line 24—in which each tap represents a temporal sample of the signal. This is implemented, e. g., by sequential on-off switching of buffer enables on a parallel set of signal amplifiers 16, one for each VCSEL input.

An alternate approach is to incorporate the on-off switching into the VCSEL bias circuit 52 (not shown, but standard in high-speed applications of VCSEL technology). The effect of either choice of on-off switching is the same: a temporal sample of the incoming signal 11 is impressed upon the VCSEL, with the resultant generated light modulation then representing a sample of the signal 11.

The signal samples drive a VCSEL array that, in turn, illuminates a CMOS 134 image array. The image formed on the CMOS 134 image array is the desired time-resolved lidar signal for a single spatial pixel in the system focal plane. This signal can be readily digitized and processed with relatively slow-speed electronics, akin to what is commonly done in current mass-market digital cameras.

This is extended to an additional dimension (FIGS. 9 and 13), in the form of an implementation that can generate 2D spatial-temporal images on a CMOS image detector 134. This implementation is analogous to the STIL technology (covered in sections that follow) that produces 3D images in a pushbroom fashion by fan-beam illumination with repetitive laser pulses 82—using a streak camera 170 to form 2D spatial-temporal images for each pulse 82.

Thus, the present solution to 3D imaging provides the performance needed from the streak tube using available semiconductor components (this is shown more explicitly in the next section, see Table 4), but without using any high-speed digitization. This is a solid-state advance over the streak tube 170, which neatly combines analog and digital electronics with optronics, leading to a very small, high-performance 3D imaging solution.

Replacement of the pushbroom-style 3D lidar (FIG. 13) by a flash 3D lidar configuration in preferred embodiments takes the form of a photodiode array (FIG. 14) in the focal plane. The diode array is followed by a TIA array that drives the delay line—and then a VCSEL array that in turn illuminates the two-dimensional (2D) CMOS array, where the 3D image is captured.

Here the line array of photodiodes (FIG. 13) gives way to a 2D photodiode array (4×4 for tutorial and prototyping purposes). This array, lying in the focal plane, drives a corresponding 2D array of transimpedance amplifiers (2D TIA array) 116.

This TIA array in turn drives the input to the tapped delay lines 24, whose outputs are connected directly to VCSELs. The VCSEL arrays provide light signals 11 to the 2D CMOS detector 134 array where the full 3D flash-lidar image is captured (again, one per laser pulse).

In practice these successive arrays are connected using integrated-circuit and high-density interconnection technology that is common within the electronics industry. Although this approach is analogous to existing 3D imagers based on the streak tube—in that it combines electronic and photonic technologies to circumvent the need for high-speed digitization—this approach is different in that it uses no electron tube, and requires no fabrication of custom, high-speed, mixed-signal integrated circuits.

Preferred embodiments of these forms of the invention may be hybrids of semiconductor photonics and electronics; they have the small size of integrated-circuit technologies but the capability of high-performance electron-tube systems, akin to streak-tube imaging lidar. The next section explores this relationship further.

The Present Invention in Relation to Streak Tube 3D Imaging

The ensemble of technologies involved in the present invention can be configured to behave as a 3D imaging system. The streak-tube imaging lidar is an imaging streak camera configured to time-resolve the backscatter of a line projected at range 68 (FIG. 15) by a pulse laser 83 source, leading—for each pulse 82—to a 2D spatial-temporal image that can be captured with a 2D CCD 234 (or like) array. The streak camera enables 3D imaging as follows.

1) The line image of backscattered light is formed on the streak-tube photocathode 108, generating a corresponding line image of photoelectrons within the tube. This electronic image is accelerated toward the anode end of the streak tube, which is phosphor coated.

2) The photoelectrons are electrostatically deflected (swept) across the phosphor. The sweep action forms on the phosphor a 2D image that has spatial (line-image axis) and temporal (deflection/sweep axis) dimensions.

Figure 9:
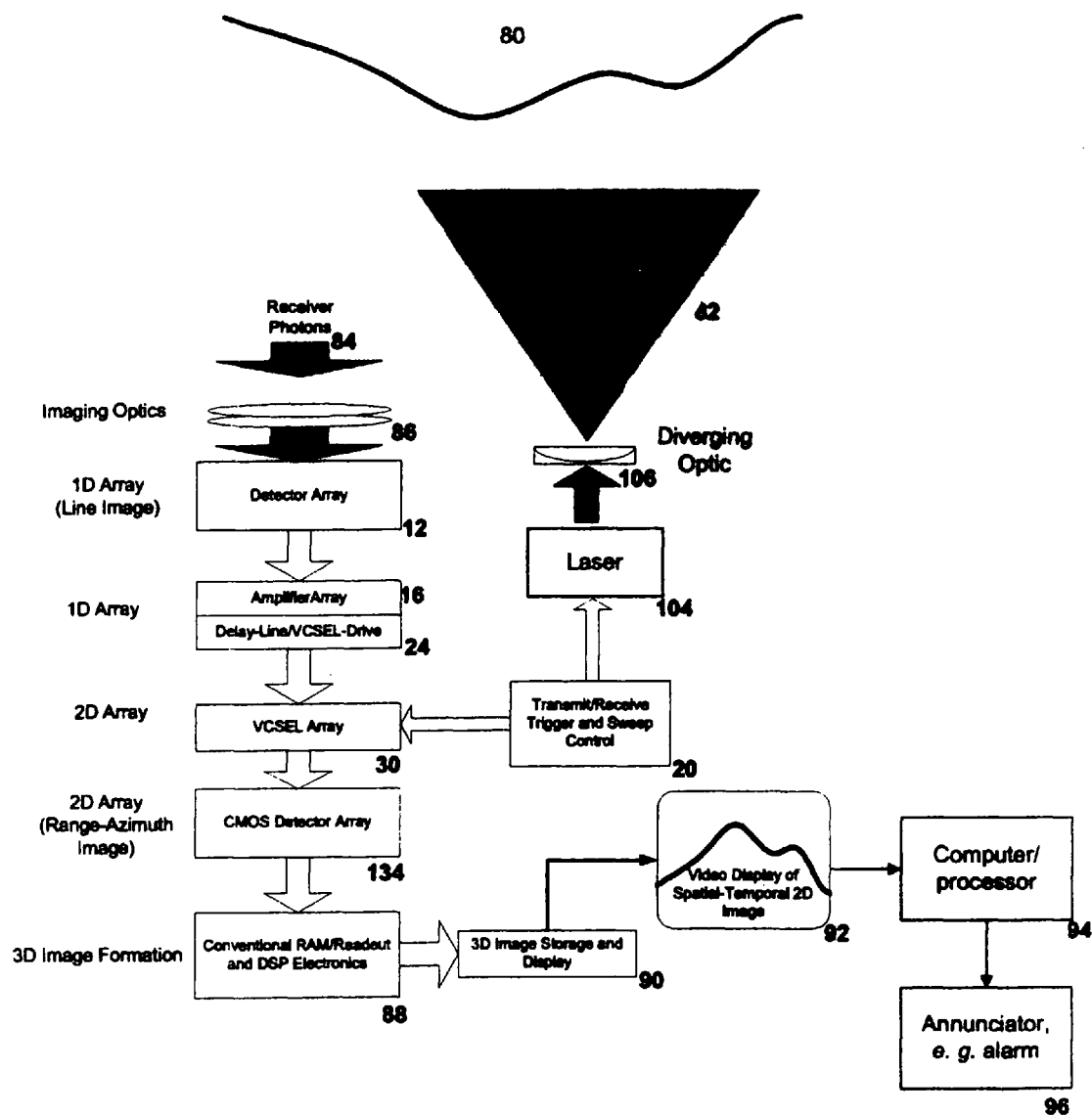
FIG. 9 is a system block diagram for three-dimensional (3D) imaging lidar according to a preferred embodiment of the invention.
Figure 15:
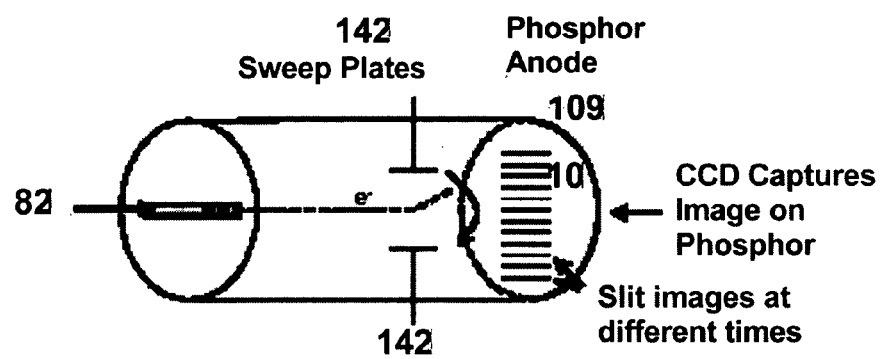
FIG. 15 is an elevational view of prior-art streak-tube technology for generating 2D spatial-temporal images.

3) The CCD 234 camera captures the 2D image formed. Typically the third dimension is generated in pushbroom fashion by repetitively pulsing the laser—while moving the source-and-sensor platform (FIGS. 9 and 15).

The tube geometry lends itself readily to a pushbroom lidar that projects a fan beam (a line image at range), forms an image of this fan beam on the photocathode 108, and then proceeds to range-resolve the entire fan beam (line image) at once—leading to the 2D temporal-spatial image for each laser pulse 82. If enough room is available on the photocathode 108 for more than one line image, however, then many lines—or equivalent fan beams—can be imaged onto the photocathode 108 and range-resolved as an ensemble.

Figure 16:
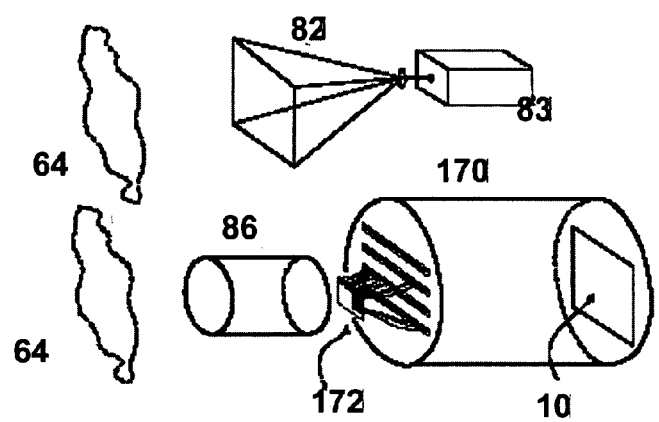
FIG. 16 is an elevational view of prior-art multislit streak-tube imaging lidar—particularly used in a flash-lidar configuration.

This latter composite imaging is precursor to a flash lidar, which in the case of streak-tube technology is in effect a group of fan-beam lidar receivers all combined onto one streak tube. A streak tube 170 can be used in this way to generate a flash-lidar system (FIG. 16).

This is precisely the type of system that was used to generate some imagery discussed earlier (FIG. 7). Here some elements are the projection of a rectangular pulsed-laser light source and remapping of the 2D focal plane onto streak-tube slits, or line images—and in due course to full 3D images at the phosphor end of the streak tube, for each shot of the laser.

In comparison to the STIL technology, the commercially available off-the-shelf-components that comprise the signal chain, according to preferred embodiments of the invention are:

a. a high-speed linear detector array 12 (e. g., InGaAs);
 b. a transimpedance amplifier 116 array or hybrid package;
 c. a programmable tapped delay element (e. g., surface acoustic-wave [SAW] device);
 d. a vertical-cavity surface-emitting laser (VCSEL) array; and
 e. a 2D image detector 34 (e. g., CMOS 134 or CCD 234 array).

Since the photodiode array is inherently discrete (as is opposed to the continuous photocathode 108 of the streak 170 tube), the present invention can be used in any of at least three distinct operating modes: flying-spot (single-pixel) lidar, fan-beam (pushbroom) lidar, or flash lidar. In certain most-highly preferred embodiments of the invention, the flash-lidar configuration is elected for the benefits of its instantaneous 3D lidar capability. Nevertheless the present invention offers flexibility in choosing approaches, which in itself can offer many advantages.

Although the present approach employs different technologies, it follows an underlying sequence of events that is somewhat analogous to that of the streak-camera systems (Table 3):

1) A line image of the backscattered light, formed on the high-speed photodetector array 12 (e. g., InGaAs) is amplified and distributed to many columns (one column per InGaAs pixel) of switchable VCSEL drivers.

2) Each row of VCSEL drivers is enabled in time sequence, causing the VCSEL array to emit photons in proportion to the signal present from the InGaAs detection element.

3) The CCD 234 or CMOS 134 array captures the 2D image formed.

A performance comparison for STIL and now-preferred receiver technologies may be noted (Table 4). The weight and volume estimates are based on a 64×64 spatial-element flash lidar, with decimeter range 68 resolution. The STIL technology estimates assume a military camera based on a Photonis P930 streak tube and custom electronics.

The invention estimates are based on commercially available off-the-shelf components and engineering figures for required packaging/integration. First-order calculations for sensitivity, bandwidth and packaging indicate that the invention matches the streak-tube performance in many of the relevant parameters. It is known, however, that the photodiode-TIA combination can be optimized for noise performance by using a customized TIA 116.

A person skilled in the art can appreciate that because the system utilizes mainly commercially available technologies as its core elements, and because prototyping and testing of this technology can be accomplished using existing RF and high-speed circuit design techniques (without resorting to custom silicon fabrication), the present system is easily adaptable to various applications and customized performance levels.

Preferred embodiments of the invention nevertheless can be based on customized parts. In one such assemblage, a readout module 190 (FIG. 17*a*, courtesy of Irvine Sensor Corporation) has an infrared-detector line array (64×1 channel wideband interface). A printed-circuit board 192 carries a CMOS 134 or CCD 234 imager (64×64).

The imaging board 192 and readout module 190 are advantageously positioned very close together and sealed in place. Preferably the PC board 192 is very large (not shown), and includes electronics and sockets for a readout-module tape cable 194—as well as physical support for the readout module 190.

The tape cable 194 (FIG. 17*b*) is advantageously attached to the board 192. In preferred embodiments the tape-cable module interface 194 is ball-grid-array-bonded to the module and connector.

In preferred embodiments this interface is a 64×64 VCSEL array, bump-bonded to the module. The VCSEL output falls on a matched imaging-array combination, which captures the amplitudes of all the incoming pulse segments.

The module 190 components (FIG. 17*c*) include two passive silicon caps 198 in the module—as well as active sixty-four silicon slices 200 of 30 to 100 microns each, to match the pitch of the VCSELs. Bus stripes 202 interconnect clocks and power control to all layers.

The module is connected to a line array of detectors on 30- to 40-micron centers, wirebonded to the module 190. Metalization on the module face can be used to compensate for differences in detector 12 and VCSEL spacing.

Each single slice of the readout module 190 (FIG. 17*d*) has mosaic VCSEL bumps 196 bound on top of the module 190, and input/output ("I/O") connections 204 that pass through the side of the layer for a bus interconnection. In this exemplary embodiment the detector line array 12 connects at the bottom of the slice. Electronics include a detector buffer, common electronics, timing, and sixty-four channel output VCSEL drive electronics.

Single-pixel Embodiment Evaluation

In customizing parts for optimization or testing of preferred embodiments it is advisable to begin with the design of a single-pixel embodiment to address design issues down to the component level through analysis, simulation and limited prototyping. To build a robust elemental (single pixel) system, the following features should be tested for optimization. Workers in this field will understand, and will be able to and carry out, such testing:

1. assessment of commercially available component technology for application to development of the invention in terms of availability for prototype, and applicability to terrestrial and marine lidar applications—
   a. photodiode arrays: impedance matching, noise performance and dynamic range;
   b. transimpedance amplifier 16 arrays: evaluation of bandwidth, packaging, impedance matching, and low-noise design limitations;
   c. VCSEL arrays: evaluate bandwidth, threshold, dynamic range, and power consumption;
   d. delay line 24: technology options, noise behavior, and bandwidth;

2. characterization of analog performance for the photodetection-transimpedance-emitter signal chain—
   a. gain, phase and transient response for each element (photodetector 112, transimpedance amplifier 116, and VCSEL 30);
   b. front-end integrated noise performance;
   c. gain, phase and transient response for the ensemble;
3. assessment of the scalability of the elemental design to larger N×N arrays, leading to both pushbroom and flash-lidar systems—
   a. evaluation of the potential for an applicable N×N prototype; and
   b. system design of an N×N (e. g. N=4) prototype for implementation.

The single-pixel sensor embodiment or its optimization should be tested using a model or single-pixel subassembly. This is best done by building a model, using design software for a standard analog-signal and mixed-signal-circuit simulation—as for example building a PSPICE® model of the signal chain—to provide a basis for evaluating and understanding the experimental results.

Next it is advisable to build a printed-circuit board (PCB) test fixture that allows for placement and testing of individual components, and the ensemble of components that make up the entire single-pixel channel 58. Test-fixture connectors should accommodate all the test instruments to be used (e. g., SMA for network analyzer, fiber connect for streak camera and test laser), and should include subcircuits for:
   a. the front-end photodetector 112,
   b. the transimpedance amplifier 116, and
   c. the VCSEL photoemitter driver.

The fixture should also enable these components to be connected together and characterized as a system. The characterization can be made for the subcircuits individually and for the system as a whole, and preferably includes characterization of:
   a. d. c. current and voltage behavior,
   b. temperature dependence of gain and phase,
   c. signal gain and phase, and
   d. noise and dynamic range.

Multipixel Embodiment Evaluation

Figure 11:
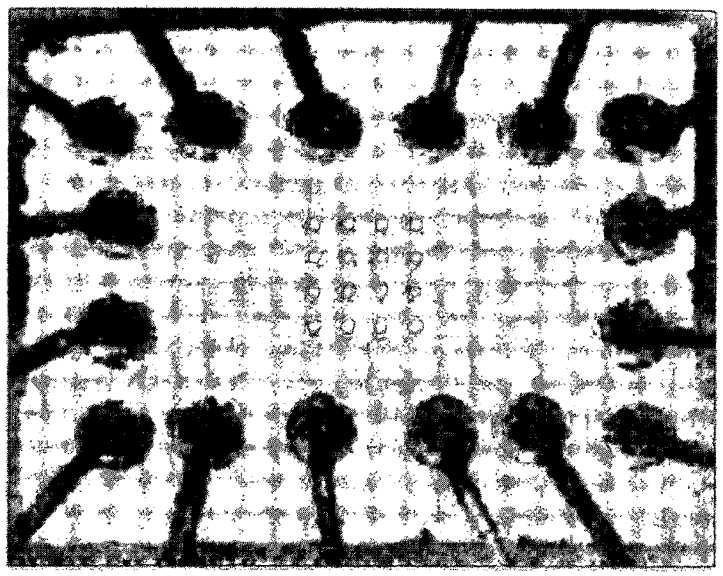
FIG. 11 is a photograph of a 4×4 VCSEL prototype on a substrate (Honeywell, 2000)
Figure 12:
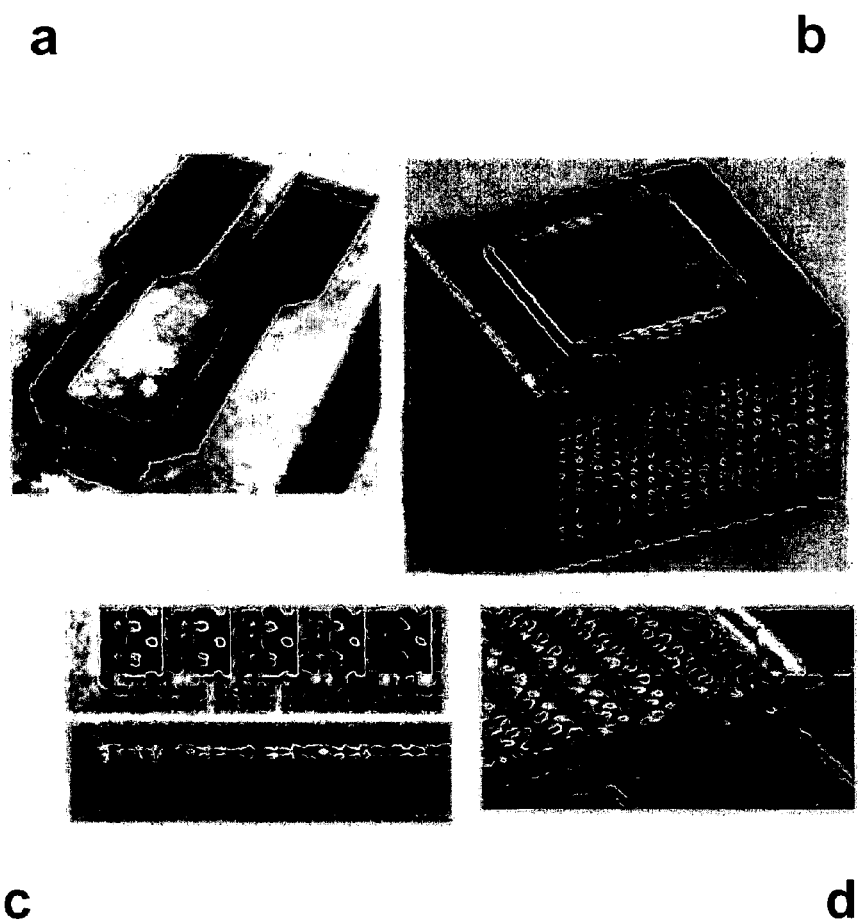
FIG. 12 is a group of photographs showing (a) a TIA-VCSEL array driven with flexible interconnect, (b) an example of a TIA-VCSEL multidie cube, (c) a close-up of the TIA-VCSEL cube edge interface and (d) a close-up of a VCSEL array, (Irvine Sensor Corporation, 2002)
Figure 13:
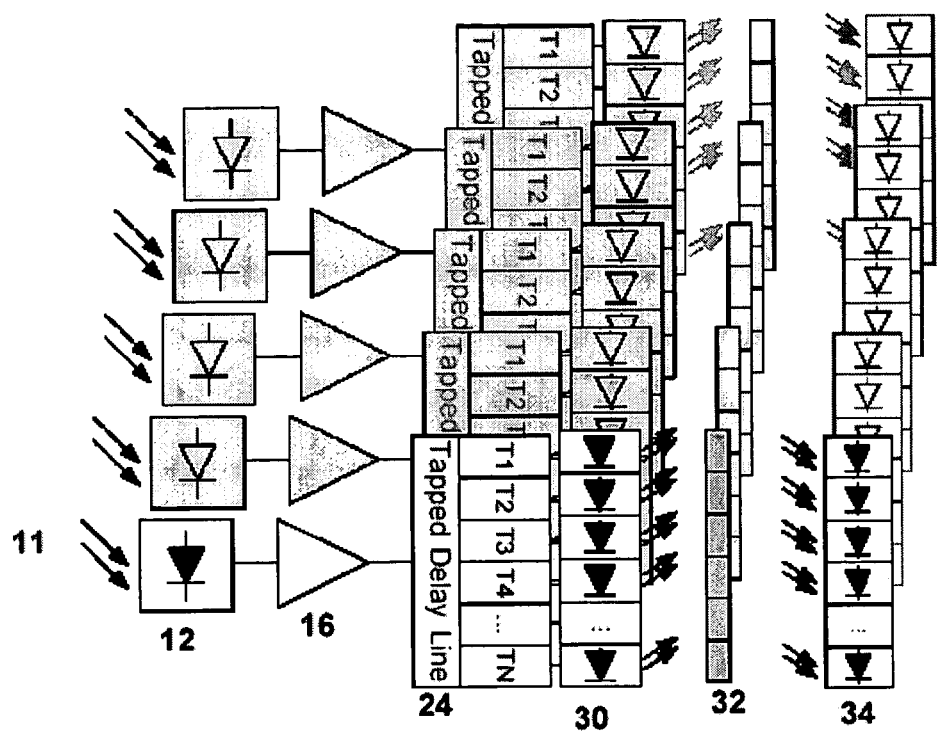
FIG. 13 is an elevational view of a five-pixel (linear array in the focal plane) receiver with N range pixels (bins) according to a preferred embodiment of the invention (for simplicity the control and digitizer electronics are omitted; however, for a person skilled in this field these components are implicit in the diagram)
Figure 14:
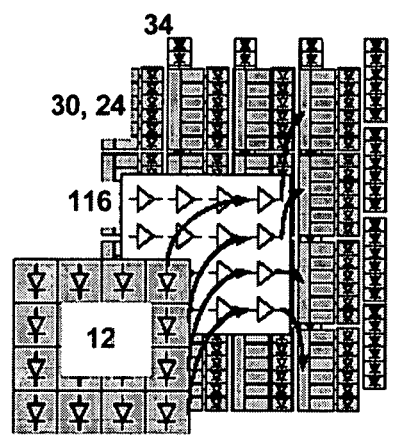
FIG. 14 is an elevational view of a flash-lidar configuration according to a preferred embodiment of the invention.

The preferred multipixel embodiment can be optimized or tested using the measured and modeled results of the single-pixel embodiment evaluation and existing commercial technology (FIG. 11) to expand the system design to encompass an N×N array design (e. g. FIGS. 13 and 17). In this preferred method for testing or optimization of the system, evaluation of a pair of the single-pixel embodiments is recommended so that channel-to-channel interactions are taken into account in designing the N×N array.

Also recommended is the use of a pair of linear stage positioners to capture 3D imagery. These indicate the potential for scaling of the single-pixel design. It is also preferred that the N×N evaluation examine system power, sensor noise, channel cross-coupling and other component-level interaction. Thus a reasonably complete characterization can be made/deduced from the single-pixel embodiment as applied to an N×N array, as will appreciated by workers skilled in this field.

As suggested earlier, one objective of this invention is manufacturing economy. Accordingly it is advisable to seek implementation of the invention in configurations that can be manufactured as inexpensively as possible without significantly impairing performance.

In certain of the accompanying apparatus claims generally the term "such" is used (instead of "said" or "the") in the bodies of the claims, when reciting elements of the claimed invention, for referring back to features which are introduced in preamble as part of the context or environment of the claimed invention. The purpose of this convention is to aid in more distinctly and emphatically pointing out which features are elements of the claimed invention, and which are parts of its context—and thereby to more particularly claim the invention.

It will be understood that the foregoing disclosure is intended to be merely exemplary, and not to limit the scope of the invention—which is to be determined by reference to the appended claims.

TABLE 1

Issues associated with noise, bandwidth and dynamic range for each component in the signal chain.

| Element/Issue | Noise | Bandwidth | Dynamic Range |
|---|---|---|---|
| Photodiode | Dominated by shot noise (quantum efficiency) | Limited by equivalent diode capacitance and the closeness of the amplifier to an ideal current source | Limited by the detector size and applied bias |
| TIA | Set by amp intrinsic noise voltage/current, source impedance, bandwidth | Limited by gain bandwidth product, feedback resistor, diode capacitance | Limited by NEP, output rail voltage |
| Distribution Amp | Set by noise figure, but as part of system noise will be mitigated by TIA gain. | Limited by gain bandwidth product | Limited by IP3, output rail voltage |
| Buffer/Switch | Small charge injection noise may be an issue | Switch enable rise/fall times | Set by rail voltage and switch conductance in on state |
| VCSEL | Shot to shot amplitude noise is likely to dominate; second oreder effects will include thermal and laseremission (amplitude) noise. | Limited by the threshold transition (rise/fall) times for on-off modulation; limited by device intrinsics for CW modulation (many GHz). | Limited by ability to control bias near edge of threshold and linearity and repeatability of on-off . modulation of the laser |
| Photodiode | Readout, dark noise will dominate, given significant light output of VCSELs. | Not an issue, as this element will be an integrator, or low pass filter. | Limited by VCSEL dynamic range on low end, well depth on high end. |

TABLE 2

Representative values for a commercial over-the-counter technology front end according to a

| Element/Issue | Noise | Bandwidth | Dynamic Range |
|---|---|---|---|
| Photodiode | >30% QE | >1 GHz | >20 dB |
| TIA | >8 fW/√Hz | <200 MHz | 100,000 (2V/2e-5V) |
| Distribution Amp | /√Hz | Est same at TI opamp | Limited by IP3 |
| Buffer/Switch | Small charge injection noise may be an issue | 73 Mhz | Set by rail voltage |
| VCSEL | TBD noise from thermal, threshold/ wavelength | 182 MHz | 6 mA/ 0.1 mA = 60 |
| Photodiode |  | >1 MHz ADC/ readout | >6 bits (VCSEL limited, >8 bits otherwise) |

TABLE 3

Analogy between preferred embodiments of the present invention and streak camera systems for 3D image generation.

| Function | Streak Camera Component | HESS Component |
|---|---|---|
| Photon-photoelectron conversion | Photocathode (e.g. S10) | GaAs detector array |
| Photoelectron gain | Multi-KV cathod/anode tube biss | Transimpedance amplifier array |

TABLE 3-continued

Analogy between preferred embodiments of the present invention and streak camera systems for 3D image generation.

| Function | Streak Camera Component | HESS Component |
|---|---|---|
| Controllable time resolution | Electrostatic sweep electrodes | CMO5 or SAW delay line |
| Photoelectron-photon conversion | Phosphor (e.g. P20) | VCSEL array |
| Image capture | CCD camera | CCD, CMOS, or other array |

TABLE 4

Comparison of receiver technologies for performance between STIL and preferred embodiments of the present invention.

| Parameter | STIL | HESS (COTS) |
|---|---|---|
| Minimum focal plane pixel size | 20 μm | 50 μm |
| Maximum radiant gain | 15 dB | >30 dB |
| Visible quantum efficiency (530 nm) | 10% | >30% |
| IR quantum efficiency (1500 nm) | 0% | >80% |
| Maximum temporal resolution | 2 ps | 20 ps |
| Packaged receiver volume | 5000 cm$^3$ | 1000 cm$^3$ |
| Packaged receiver weight | 4000 g | 600 g |

What is claimed is:

1. A lidar system comprising:
means for generating a measurement signal that is at least one-dimensional, corresponding to a received at-least-one-dimensional lidar-beam pulse;
means for time-resolving the measurement signal, said resolving means comprising:
multiple memory elements for receiving and holding successive portions of the measurement signal respectively,
digital means for forming a digital sweep signal defining multiple digital states corresponding to the respective memory elements, and
means for applying the digital sweep signal to control distribution of the successive measurement-signal portions into the respective memory elements;
wherein the forming means comprise a logic circuit generating a series of digital pointers addressing the memory elements respectively;
means for reading the measurement-signal portions from the memory elements; and
multiple buffer switches transferring the successive measurement-signal portions to the multiple memory elements respectively;
each buffer switch having a respective enable terminal actuated by a respective one of the digital pointers.

2. The system of claim 1, further comprising:
multiple electrooptical converters respectively receiving the successive measurement-signal portions from the buffer switches, respectively, and in response generating corresponding optical signals; and
multiple optoelectronic converters receiving the corresponding optical signals and in response generating new corresponding measurement-signal portions for application to the multiple memory elements.

3. The system of claim 2, wherein:
the electrooptical converters are selected from the group consisting of VCSELs, LEDs, and organic LEDs.

4. The system of claim 2, wherein:
the optoelectronic converters are selected from the group consisting of CMOS elements, organic phase-shift molecular devices, and a printed-circuit stack of thin-film devices.

5. A lidar system comprising:
means for generating a measurement signal that is at least one-dimensional, corresponding to a received at-least-one-dimensional lidar-beam pulse;
means for time-resolving the measurement signal, said resolving means comprising:
multiple memory elements for receiving and holding successive portions of the measurement signal respectively,
digital means for forming a digital sweep signal defining multiple digital states corresponding to the respective memory elements, and
means for applying the digital sweep signal to control distribution of the successive measurement-signal portions into the respective memory elements; and
means for reading the measurement-signal portions from the memory elements; wherein:
the forming means comprise a tapped delay line having multiple taps addressing the multiple memory elements respectively.

6. The system of claim 5, wherein:
the memory elements comprise a dynamic RAM or other capacitive array receiving the measurement signal-portions substantially directly from the distribution controlled by the delay-line taps.

7. The system of claim 5, further comprising:
multiple buffer switches transferring the successive measurement-signal portions to the multiple memory elements respectively;
each buffer switch having a respective enable terminal actuated by a respective one of the delay-line taps.

8. The system of claim 7, further comprising:
multiple electrooptical converters respectively receiving the successive measurement-signal portions from the buffer switches, respectively, and in response generating corresponding optical signals; and
multiple optoelectronic converters receiving the corresponding optical signals and in response generating new corresponding measurement-signal portions for application to the multiple memory elements.

9. The system of claim 8, wherein:
the electrooptical converters are selected from the group consisting of VCSELs, LEDs, and organic LEDs.

10. The system of claim 8, wherein:
the optoelectronic converters are selected from the group consisting of CMOS elements, organic phase-shift molecular devices, and a printed-circuit stack of thin-film devices.

11. A lidar system comprising:
means for generating a measurement signal that is at least one-dimensional, corresponding to a received at-least-one-dimensional lidar-beam pulse;
means for time-resolving the measurement signal, said resolving means comprising:
multiple memory elements for receiving and holding successive portions of the measurement signal respectively,
digital means for forming a digital sweep signal defining multiple digital states corresponding to the respective memory elements, and
means for applying the digital sweep signal to control distribution of the successive measurement-signal portions into the respective memory elements; and
means for reading the measurement-signal portions from the memory elements; wherein:
the forming means comprise a delay line that comprises the memory elements;
the delay line itself has clock signals serving as the digital sweep signal; and
the delay line responds to the clock signals by successively advancing the received successive measurement-signal portions into the delay line.

12. The system of claim 11, wherein:
the memory elements comprise a dynamic RAM or other capacitive array receiving the measurement signal-portions substantially directly from the distribution controlled by the clock signals.

13. The system of claim 11, wherein:
the delay line is a shift register;
the memory elements are successive positions in the shift register itself; and
the reading means comprise parallel circuits for reading plural measurement-signal portions substantially simultaneously from the shift register.

14. The system of claim 11, further comprising:
an analog-to-digital converter, digitizing the successive measurement-signal portions for application to the delay line.

15. A lidar system comprising:
means for generating a measurement signal corresponding to a received lidar-beam pulse;
means for time-resolving the measurement signal;
multiple electrooptical converters respectively receiving time-resolved measurement-signal portions from the resolving means, and in response forming new corresponding optical signals; and
means for reading the measurement-signal portions as the new corresponding optical signals from the electrooptical converters.

16. The system of claim 15, wherein:
the electrooptical converters are LEDs.

17. The system of claim 15, wherein:
the electrooptical converters are organic LEDs.

18. The system of claim 15, wherein:
the electrooptical converters are VCSELs.

19. The system of claim 18, further comprising:
multiple optoelectronic converters receiving the corresponding new optical signals from the VCSELs and in response forming new corresponding measurement-signal portions for readout by the reading means.

20. The system of claim 19, wherein:
the optoelectronic converters are CMOS elements.

21. The system of claim 19, wherein:
the optoelectronic converters are optical phase-shift molecules.

22. The system of claim 19, wherein:
the optoelectronic converters are printed-circuit stacks of thin-film devices.

23. The system of claim 15, further comprising:
multiple optoelectronic converters receiving the new corresponding optical signals and in response forming new corresponding measurement-signal portions for readout by the reading means.

24. The system of claim 23, wherein:
the optoelectronic converters are CMOS elements.

25. The system of claim 15, wherein:
the resolving means comprise multiple buffer switches directing the time-resolved measurement-signal portions to the multiple electrooptical converters, respectively;
the multiple buffer switches comprise respective enable terminals actuated by a synchronous enable signal.

26. The system of claim 25, wherein:
the synchronous enable signal is substantially in controlled-delay synchronism with the lidar-beam pulse.

27. The system of claim 25, wherein:
before said synchronous enable signal, each enable terminal is connected to receive a bias input that holds the respective electrooptical converter just within a quiescent state.

28. The system of claim 27, wherein:
readout from the respective electrooptical converter is terminated by another synchronous signal after a time interval allowing for collection of the time-resolved measurement-signal portion from that respective electrooptical converter.

29. The system of claim 15, for detecting and ranging objects; said system further comprising:
means for projecting an at-least-one-dimensional light pulse toward such objects; and
means for receiving an at-least-one-dimensional reflected light pulse from such objects;
wherein the generating means comprise means for generating said measurement signal in response to the received light pulse.

30. A lidar system comprising:
means for generating an at-least-one-dimensional measurement signal corresponding to an at-least-one-dimensional received lidar-beam pulse;
means for time-resolving the measurement signal;
multiple memory elements, comprising a dynamic RAM or other capacitive array, respectively receiving and holding time-resolved measurement-signal portions substantially directly from the resolving means; and
means for reading the held measurement-signal portions from the memory elements; and
multiple buffer switches transferring the time-resolved measurement-signal portions from the resolving means substantially directly to the multiple memory elements respectively;
each buffer switch having a respective enable terminal actuated by the resolving means.

31. The system of claim 30, for detecting and ranging objects; said system further comprising:
means for projecting an at-least-one-dimensional light pulse toward such objects; and
means for receiving an at-least-one-dimensional reflected light pulse from such objects;
wherein the generating means comprise means for generating said measurement signal in response to the received light pulse.

* * * * *